(12) United States Patent
Iyer et al.

(10) Patent No.: US 11,634,039 B2
(45) Date of Patent: Apr. 25, 2023

(54) SYSTEM AND METHOD FOR INTEGRATED BATTERY CHARGING AND PROPULSION IN PLUG-IN ELECTRIC VEHICLES

(71) Applicants: MAGNA INTERNATIONAL INC., Aurora (CA); K. Lakshmi Varaha Iyer, Windsor (CA); Gernot Steinmair, St. Valentin (AT); Jasmin Jijina Sinkular, Troy, MI (US)

(72) Inventors: K. Lakshmi Varaha Iyer, Windsor (CA); Gernot Steinmair, St. Valentine (AT); Jasmin Jijina Sinkular, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 16/616,806

(22) PCT Filed: Jun. 1, 2018

(86) PCT No.: PCT/US2018/035633
§ 371 (c)(1),
(2) Date: Nov. 25, 2019

(87) PCT Pub. No.: WO2018/223017
PCT Pub. Date: Dec. 6, 2018

(65) Prior Publication Data
US 2021/0170890 A1 Jun. 10, 2021

Related U.S. Application Data

(60) Provisional application No. 62/514,298, filed on Jun. 2, 2017, provisional application No. 62/651,959, filed on
(Continued)

(51) Int. Cl.
*B60L 53/14* (2019.01)
*H02J 7/04* (2006.01)
(Continued)

(52) U.S. Cl.
CPC .............. *B60L 53/14* (2019.02); *B60L 53/20* (2019.02); *H02J 7/04* (2013.01); *H02J 7/1492* (2013.01);
(Continued)

(58) Field of Classification Search
CPC ... B60L 53/14; B60L 53/20; H02J 7/04; H02J 7/1492; H02K 3/28; H02K 11/0094; H02P 27/08
(Continued)

(56) References Cited

U.S. PATENT DOCUMENTS

| 7,378,773 | B2* | 5/2008 | Tajima et al. | .......... H02K 1/276 310/156.53 |
| 10,411,532 | B2* | 9/2019 | Lee et al. | ............. H02K 19/103 |

(Continued)

OTHER PUBLICATIONS

G F H Allen: "Brushless Excitation Systems for Synchronous Machines", Electronics and Power., vol. 21, No. 15, Sep. 4, 1975 (Sep. 4, 1975), pp. 866-869, XP055768770, GB ISSN: 0013-5127, DOI: 10.1049/ep.1975.0905.
(Continued)

*Primary Examiner* — Sun J Lin
(74) *Attorney, Agent, or Firm* — Dickinson Wright PLLC

(57) ABSTRACT

A system and method for integrated charging a vehicle includes a hybrid excitation machine, operable as a traction motor and including a rotor separated by an air gap from a stator with AC windings. An AC utility line power supply is connected to the AC windings providing an electrical current to the vehicle and inducing a magnetic flux across the air gap and in the rotor. A short circuit, an open circuit, or a DC voltage may be applied to a DC winding in the stator to reduce the magnetic flux into the rotor. A field coil in the rotor may be excited with a DC voltage using a secondary coil on the rotor in a traction mode. The secondary coil is excited by the stator windings using field-oriented control in
(Continued)

a "self-excited machine" embodiment, and is directly excited by a separate primary coil in an "externally-excited machine" embodiment.

20 Claims, 17 Drawing Sheets

Related U.S. Application Data on Apr. 3, 2018, provisional application No. 62/652,003, filed on Apr. 3, 2018.

(51) Int. Cl.
| | |
|---|---|
| *H02J 7/14* | (2006.01) |
| *H02K 3/28* | (2006.01) |
| *H02K 11/00* | (2016.01) |
| *H02P 27/08* | (2006.01) |
| *B60L 53/20* | (2019.01) |
| *H02K 1/2706* | (2022.01) |

(52) U.S. Cl.
CPC ........... *H02K 3/28* (2013.01); *H02K 11/0094* (2013.01); *H02P 27/08* (2013.01); *B60L 2210/10* (2013.01); *B60L 2210/30* (2013.01); *B60L 2220/56* (2013.01); *B60L 2220/58* (2013.01); *H02J 2207/20* (2020.01); *H02J 2310/48* (2020.01); *H02K 1/2706* (2013.01)

(58) Field of Classification Search
USPC ........................................................ 320/109
See application file for complete search history.

(56) References Cited

U.S. PATENT DOCUMENTS

| | | | |
|---|---|---|---|
| 2005/0052080 A1* | 3/2005 | Maslov et al. | ...... H02P 23/0077 307/10.1 |
| 2009/0103341 A1 | 4/2009 | Lee et al. | |
| 2011/0187185 A1 | 8/2011 | Dupuy | |
| 2012/0274246 A1* | 11/2012 | Radulescu | .............. B60L 53/24 318/139 |
| 2015/0180330 A1 | 6/2015 | Ye | |
| 2015/0249394 A1 | 9/2015 | Liu et al. | |
| 2016/0211786 A1 | 7/2016 | Rozman et al. | |

OTHER PUBLICATIONS

Andreas Binder: "Electrical Machines and Drives", Sep. 1, 2011 (Sep. 1, 2011), pp. 9/1-9/19, XP055768781, Darmstadt Retrieved from the Internet: URL:https://www.ew.tu-darmstadt.de/media/ew/altelehrveranstaltungen/emd/EMD 9.pdf [retrieved on Jan. 26, 2021]. EPO Supplemental Search Report issued in corresponding application EP 18 81 0159, dated Feb. 5, 2021.
Amara et al.; Hybrid Excitation Synchronous Machines: Energy-Efficient Solution for Vehicles Propulsion; IEEE Transactions on Vehicular Technology 58(5): 2137-2149; 2009; [retrieved on Aug. 8, 2018]. Retrieved from the Internet. <URL: https://www.researchgate.net/profile/Yacine_Amara/publication/224348223_Hybrid_Excitation_Synchronous_Machines_Energy-Efficient_Solution_for_Vehicles_Propulsion/links/0912f510aa1a416f11000000/Hybrid-Excitation-Synchronous-.

* cited by examiner

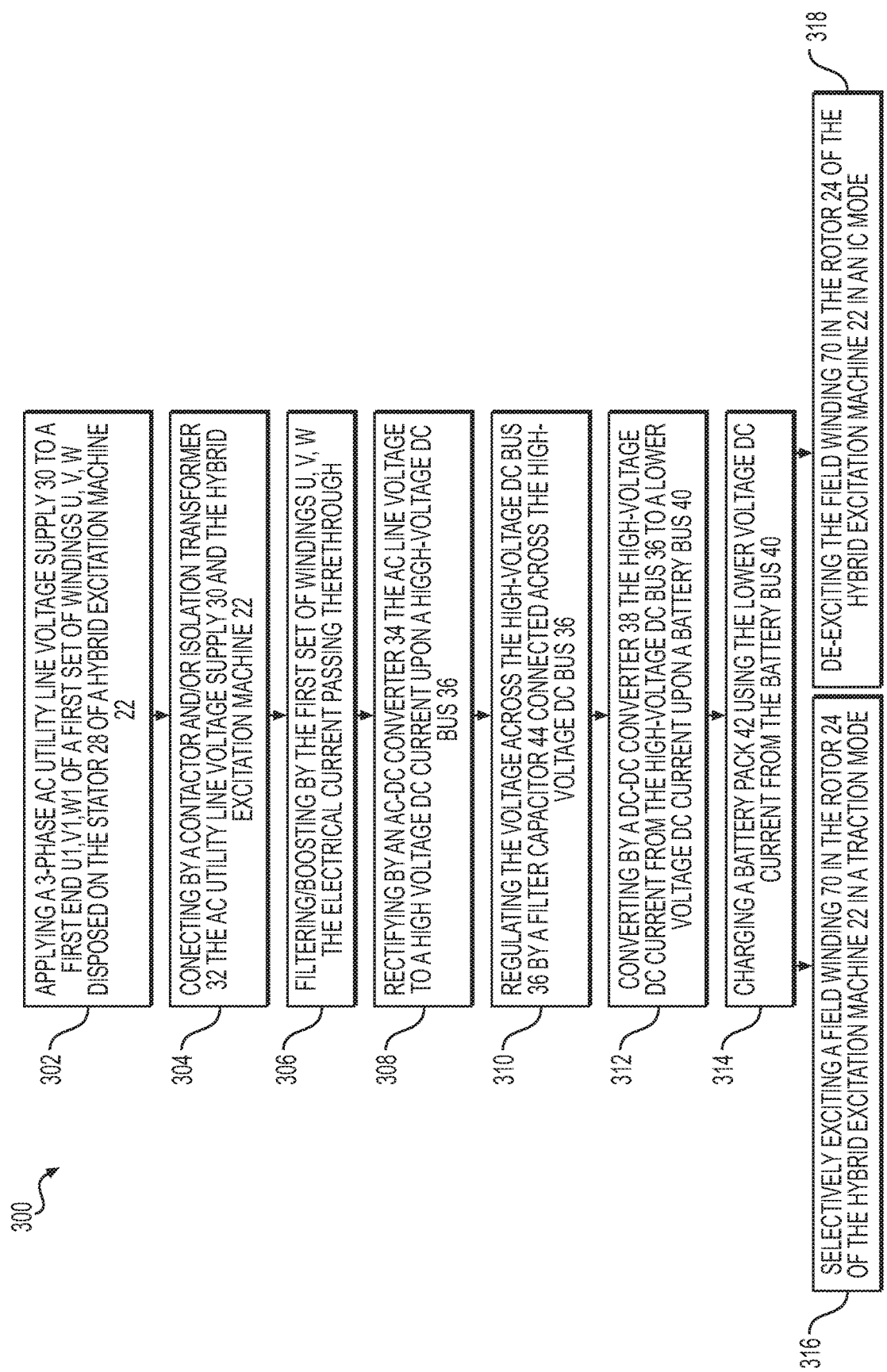

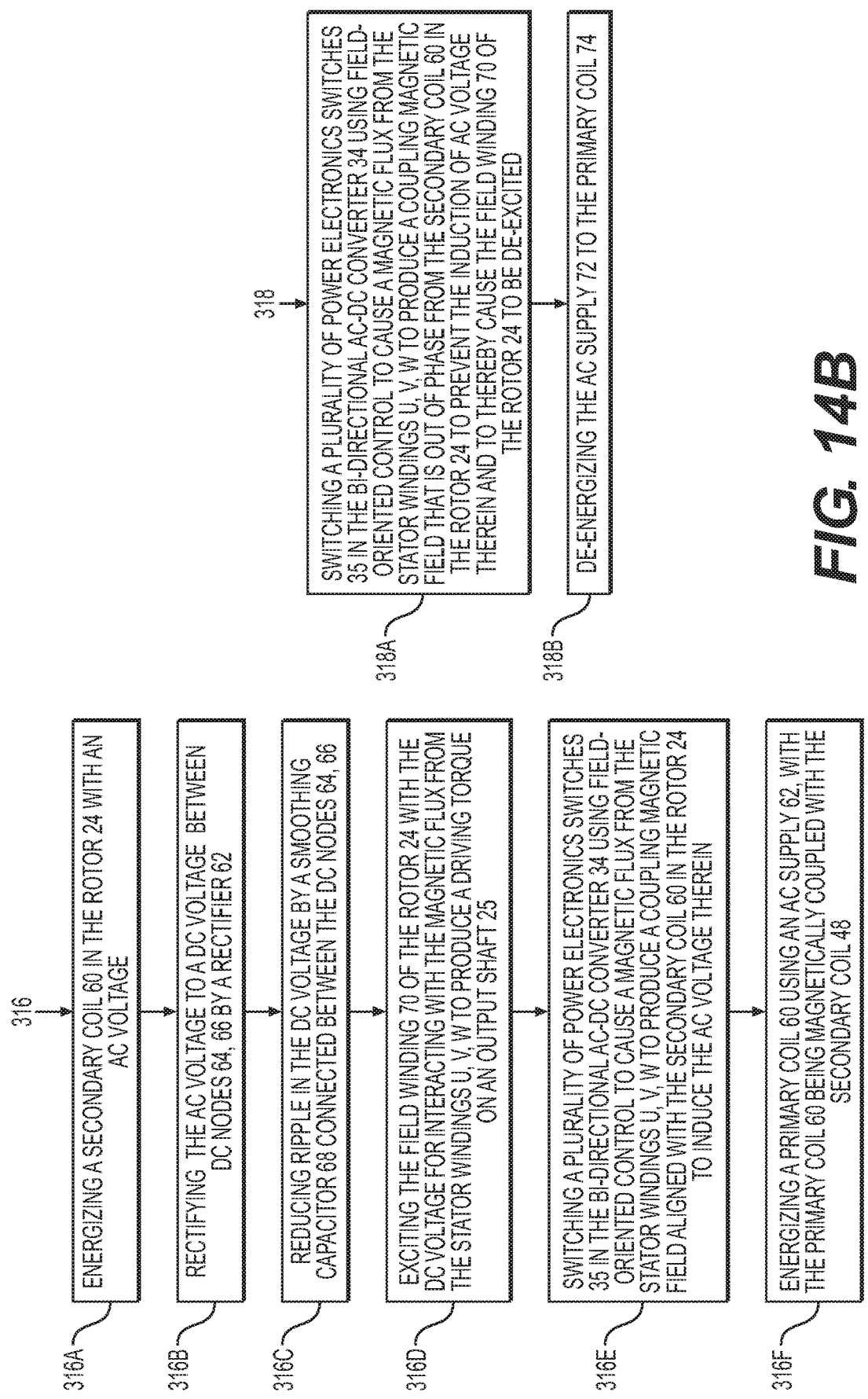

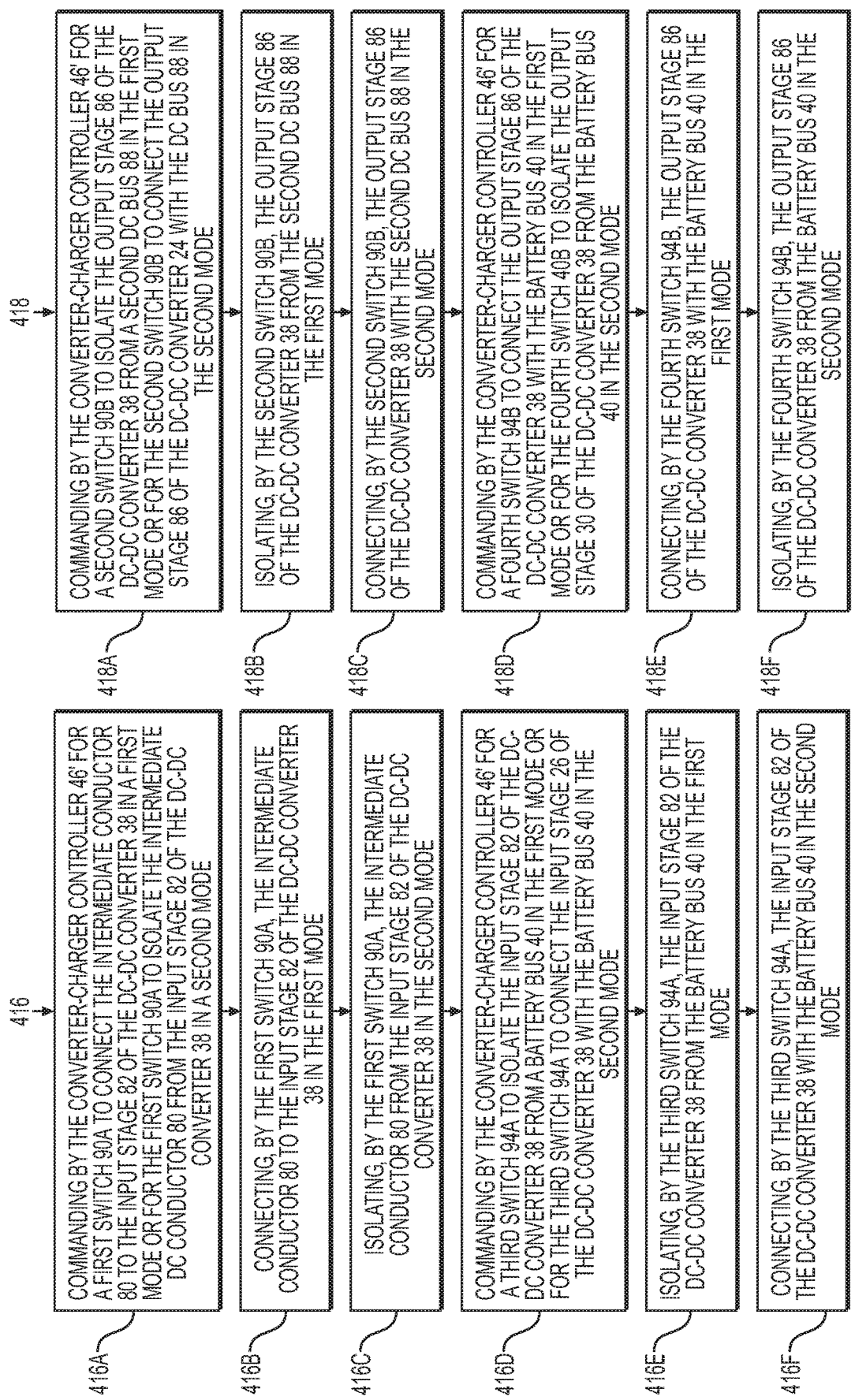

SYSTEM AND METHOD FOR INTEGRATED BATTERY CHARGING AND PROPULSION IN PLUG-IN ELECTRIC VEHICLES

CROSS REFERENCE TO RELATED APPLICATIONS

This U.S. National Stage Patent Application claims the benefit of PCT Patent Application Serial No. PCT/US2018/035633 filed Jun. 1, 2018 entitled "System And Method For Integrated Battery Charging And Propulsion In Plug-In Electric Vehicles" which claims the benefit of U.S. Provisional Patent Application Ser. No. 62/514,298, filed Jun. 2, 2017; U.S. Provisional Patent Application Ser. No. 62/651,959, filed Apr. 3, 2018; and U.S. Provisional Patent Application Ser. No. 62/652,003, filed Apr. 3, 2018. The entire disclosures of the applications being considered part of the disclosure of this application, and hereby incorporated by reference.

BACKGROUND

Different types and arrangements exist for charging the battery pack of a plug-in electric vehicle (EV) using a stationary source of electric power, typically provided by a connection to the electric grid. Plug-in EV chargers may be broadly categorized as Level 1, 2 or 3. Level 1 chargers use a standard single-phase outlet (120 VAC in North America) and take the longest time to charge the battery pack among three levels of chargers. Level 2 chargers utilize a higher supply voltage (240 VAC in North America) and are typically sold by the auto manufacturers or other electrical supply equipment manufacturers for an additional cost ranging between $500 and $2000. Level 2 charging usually takes between 2-4 hours to charge the battery pack of a typical plug-in EV. Existing Level 3 chargers, also called DC fast chargers, charge the EV battery pack using a high-voltage DC (400 to 500 VDC), and current more than 100 A. Level 3 charging generally takes 15 to 60 minutes, depending on the power level, to charge the battery pack of a typical plug-in EV. Level 3 chargers or electric vehicle supply equipment (EVSE) have a high cost, typically between $30,000 and $160,000 and are currently available only in permanent public charging stations.

Integrated charging (IC) systems integrate battery charging functionality with a vehicle's onboard electric drive system and power electronics. While charging using IC, the EV may be stationary and the terminals of the stationary motor may be connected to the utility grid to enable fast charging. The fundamental current flowing through the phases of a motor/generator would have a frequency of that of the grid. Rotating magnetic fields in the air gap produced by the current and the stationary condition of the rotor can cause problems, particularly in permanent magnet (PM) machines commonly used in the prior art. Such problems include: a) asymmetry in the phase voltage waveforms depending on the motor type and phase inductances; b) torque oscillation and hence, mechanical vibration; c) Copper, core, magnet losses and temperature rise of varied levels depending on the PM motor type due to current, magnetic field and harmonics; and d) irreversible demagnetization of the magnets, if the motor is not optimally designed for both integrated charging and traction applications.

Conventional squirrel-cage induction machine topology may address some of the above problems due to its cylindrical rotor configuration and asynchronous operation. However, an induction machine rotor may spin or vibrate while the battery pack is being charged during stationary condition of the EV. Traditional design efforts directed to aspects of a PMSM to reduce losses and eliminate torque oscillation/mechanical vibration may decrease the torque and power density of the motor when designed for traction operation. Other types of motor drive systems have been investigated for IC.

There is a large and growing market for plug-in electric vehicles that can be quickly charged without the need for a costly Level 3 charger, particularly by leveraging components already used in EVs.

Additionally, current electric vehicles (EVs) and plug-in hybrid electric vehicles (PHEVs) (plug-in electric vehicles) commonly use a separate auxiliary DC/DC converter in the vehicle to convert the high voltage DC power from the high voltage (HV) battery pack or DC bus to low voltage (LV) DC power, which is either stored in a LV DC battery or used to power electrical accessories such as radio, lights etc. in the vehicle.

In practice, a DC/DC converter is used only during propulsion or when the vehicle ignition is switched ON. An on-board battery charger is used only when the vehicle is parked and ignition is switched OFF. Currently, the charger and DC/DC converter are two separate devices in currently available vehicles. Both these devices can contain bulky transformers, switches and passive components which can increase the cost of the devices. Examples of such conventional charger and DC/DC converters are shown in the block diagrams of FIGS. 10-11.

SUMMARY

A system for integrated charging an electric vehicle includes a hybrid excitation machine operable in a traction mode as a traction motor or in an integrated charging (IC) mode is disclosed. The hybrid excitation machine includes a rotor separated by an air gap from a stator having a set of AC stator windings to conduct an AC current. The rotor may include one or more permanent magnets. The AC stator windings are configured to conduct an AC electrical current from an AC utility line voltage supply in the IC mode and for filtering and/or boosting an AC voltage therefrom. The AC electrical current in the stator windings induce a magnetic flux across the air gap and in the rotor with the AC electrical current flowing therethrough. The magnetic flux interacts with the rotor in the traction mode to produce a driving torque. The hybrid excitation machine is configured to reduce the interaction between the magnetic flux and the rotor in the IC mode.

According to an aspect of the disclosure, the stator of the hybrid excitation machine includes a DC winding configured to carry a DC current to reduce the magnetic flux across the air gap and into the rotor. The DC winding may include two or more DC windings. According to another aspect, the system may further include a DC power supply configured to apply a DC voltage across the DC winding to reduce the magnetic flux across the air gap and to reduce the magnetic flux into the rotor. According to yet another aspect, the system may further include circuitry to cause the DC winding to be in one of an open circuit configuration or a short circuit configuration to reduce the magnetic flux across the air gap and to reduce the magnetic flux through the rotor.

According to another aspect of the disclosure, the hybrid excitation machine may further include a field winding configured to be excited with a DC voltage in the traction mode to interact with the magnetic flux from the AC stator windings and to produce a driving torque. The field winding of the rotor is configured to be de-excited in the IC mode preventing the rotor from producing the driving torque.

In one embodiment, the rotor includes a secondary coil configured to be excited by a coupling magnetic field to generate an induced AC voltage. A rectifier is in electrical communication with the secondary coil for changing the induced AC voltage to a DC voltage between a DC positive node and a DC negative node. The rotor has a cylindrical configuration including a field winding connected between the DC nodes and disposed within the stator. The field winding of the rotor is configured to be excited with the DC voltage in the traction mode with the hybrid excitation machine operable as a traction motor, with the field winding interacting with the magnetic flux from the stator windings to produce a driving torque. The field winding of the rotor is configured to be de-excited in the IC mode for integrated charging (IC), thereby preventing the rotor from producing the driving torque.

According to an aspect of the disclosure, the rotor may contain permanent magnets and rotor bars shorted by jumper conductors, where electrical currents in each rotor bar flow in alternating axial directions and fluxes produced by each rotor bar get cancelled. Hence, the resultant torque due to the rotor bars will be zero during integrated charging. The rotor bars come into effect during steady-state traction operation of the hybrid excitation machine with sinusoidal back EMF and if no harmonics are present.

According to an aspect of the disclosure, the rotor may be self-excited, with the field winding being in quadrature to the secondary coil and each configured to interact with the magnetic flux from the stator windings. The system includes an IC controller configured to operate a plurality of power electronics switches in an AC-DC converter using field-oriented control to change the coupling magnetic field depending on the mode of the system. In the traction mode, IC controller is configured to operate the power electronics switches in the AC-DC converter to cause the magnetic flux from the stator windings to produce the coupling magnetic field that is aligned with the secondary coil in the rotor to induce the AC voltage therein and to thereby cause the field winding of the rotor to be excited. In the IC mode, the IC controller is configured to operate the power electronics switches in the AC-DC converter using field-oriented control to cause the magnetic flux from the stator windings to produce a magnetic field that is out of phase from the secondary coil in the rotor to prevent the induction of the induced AC voltage in the secondary coil and to thereby cause the field winding of the rotor to be de-excited.

According to another aspect, the rotor may include a secondary coil configured to be excited by a coupling magnetic field to generate an AC voltage, and a rectifier in electrical communication with the secondary coil for changing the AC voltage to a DC voltage between a DC positive node and a DC negative node. In the traction mode, an AC supply provides an AC current in a primary coil magnetically coupled with the secondary coil in the rotor to induce the induced AC voltage therein and to thereby cause the field winding of the rotor to be excited. The rotor is therefore externally excited, with the field winding being isolated from the magnetic flux from the stator windings by being axially spaced outside of the stator. In the IC mode, the AC supply is inhibited from providing the AC current in the primary coil to prevent induction of the induced AC voltage in the secondary coil and to thereby cause the field winding of the rotor to be de-excited.

According to a further aspect of the disclosure, the system includes an AC-DC converter, configured to rectify the AC electrical current from the AC utility line voltage supply to an intermediate DC voltage on an intermediate DC conductor. A DC-DC converter produces an output DC voltage different than an input DC voltage. A battery bus is energized with a first DC voltage. A second DC bus is energized with a second DC voltage different than the first DC voltage. The system is configured to operate in a first mode with the DC-DC converter transmitting electrical power from the AC-DC converter to the battery bus. The system is also configured to operate in a second mode with the DC-DC converter transmitting electrical power from battery bus to the second DC bus.

According to an aspect, the AC-DC converter includes a bridgeless totem pole PFC.

According to another aspect, the DC-DC converter includes a single or multi-phase interleaved full bridge or half bridge resonant converter of LLC or LCLC type.

According to another aspect, the DC-DC converter includes a switch-controlled capacitor.

According to yet another aspect of the disclosure, the system for integrated charging an electric vehicle comprises a hybrid excitation machine, operable in a traction mode as a traction motor or in an integrated charging (IC) mode and including a rotor separated by an air gap from a stator having a set of AC stator windings to conduct an AC current. The AC stator windings are configured to conduct an AC electrical current from an AC utility line voltage supply in the IC mode and for filtering and/or boosting an AC voltage therefrom. An AC-DC converter is configured to rectify the AC electrical current from the AC utility line voltage supply to an intermediate DC voltage on an intermediate DC conductor. A DC-DC converter produces an output DC voltage different than an input DC voltage. A battery bus is energized with a first DC voltage. A second DC bus is energized with a second DC voltage different than the first DC voltage. The system is configured to operate in a first mode with the DC-DC converter transmitting electrical power from the AC-DC converter to the battery bus. The system is also configured to operate in a second mode with the DC-DC converter transmitting electrical power from battery bus to the second DC bus.

BRIEF DESCRIPTION OF THE DRAWINGS

Further details, features and advantages of designs of the invention result from the following description of embodiment examples in reference to the associated drawings.

FIG. 14A is a flow chart of a second method in accordance with the present disclosure;

FIG. 14B is a continuation of the flow chart of FIG. 14A;

FIG. 15B is a flow chart of sub-steps of a step in the third method of FIG. 15A; and FIG. 15C is a flow chart of sub-steps of another step in the third method of FIG. 15A.

DETAILED DESCRIPTION

Figure 1:
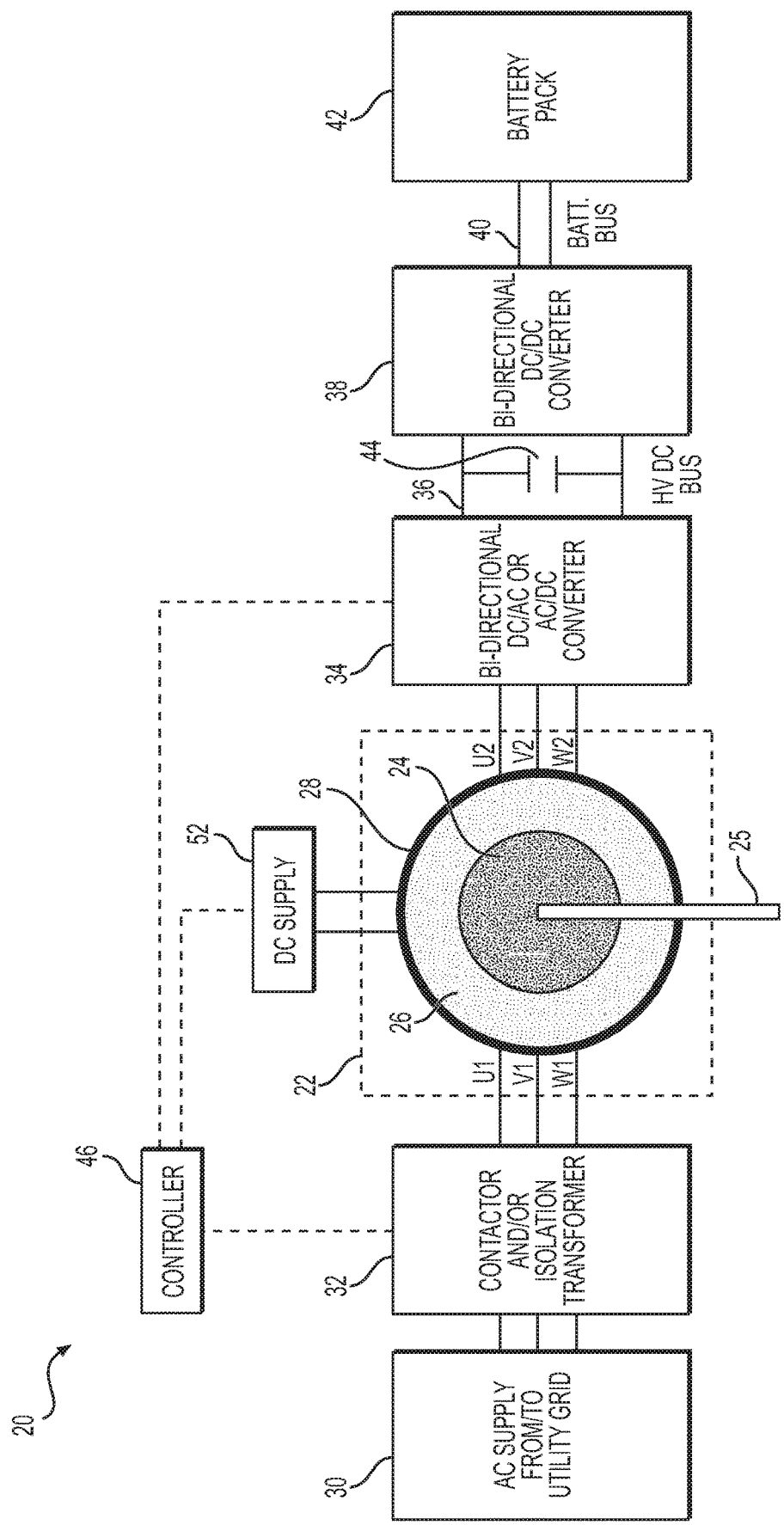
FIG. 1 is a schematic diagram of a system including a hybrid excitation machine in accordance with an embodiment of the present disclosure.

Recurring features are marked with identical reference numerals in the figures, in which an example embodiment of a system 20 for integrated charging an electric vehicle is disclosed.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the term "and/or" includes any and all combinations of one or more of the associated listed items. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As shown in FIG. 1, the system 20 includes a hybrid excitation machine 22, which may be operable as a traction motor and/or as a generator which may be used, for example, for regenerative braking when the electric vehicle (EV) is being driven. The hybrid excitation machine 22 includes one or more rotors 24 separated by an air gap 26 from one or more stators 28. The hybrid excitation machine 22 may be a permanent magnet synchronous motor (PMSM) including one or more permanent magnets in one or more stators 28 or in one or more rotors 24. The hybrid excitation machine 22 may include one or more stator and rotor cores made of magnetic material such as, for example, electrical steel. The hybrid excitation machine 22 may include a first set of windings U, V, W evenly spaced about the stator 28. The hybrid excitation machine 22 may include six or more phases, with a second set of windings A, B, C evenly spaced about the stator 28 in alternating arrangement with the first set of windings U, V, W. Each of the windings A, B, C, U, V, W may be made of, for example, copper, or aluminum, or graphene, or carbon nanotubes or a mix of these.

Figure 2:
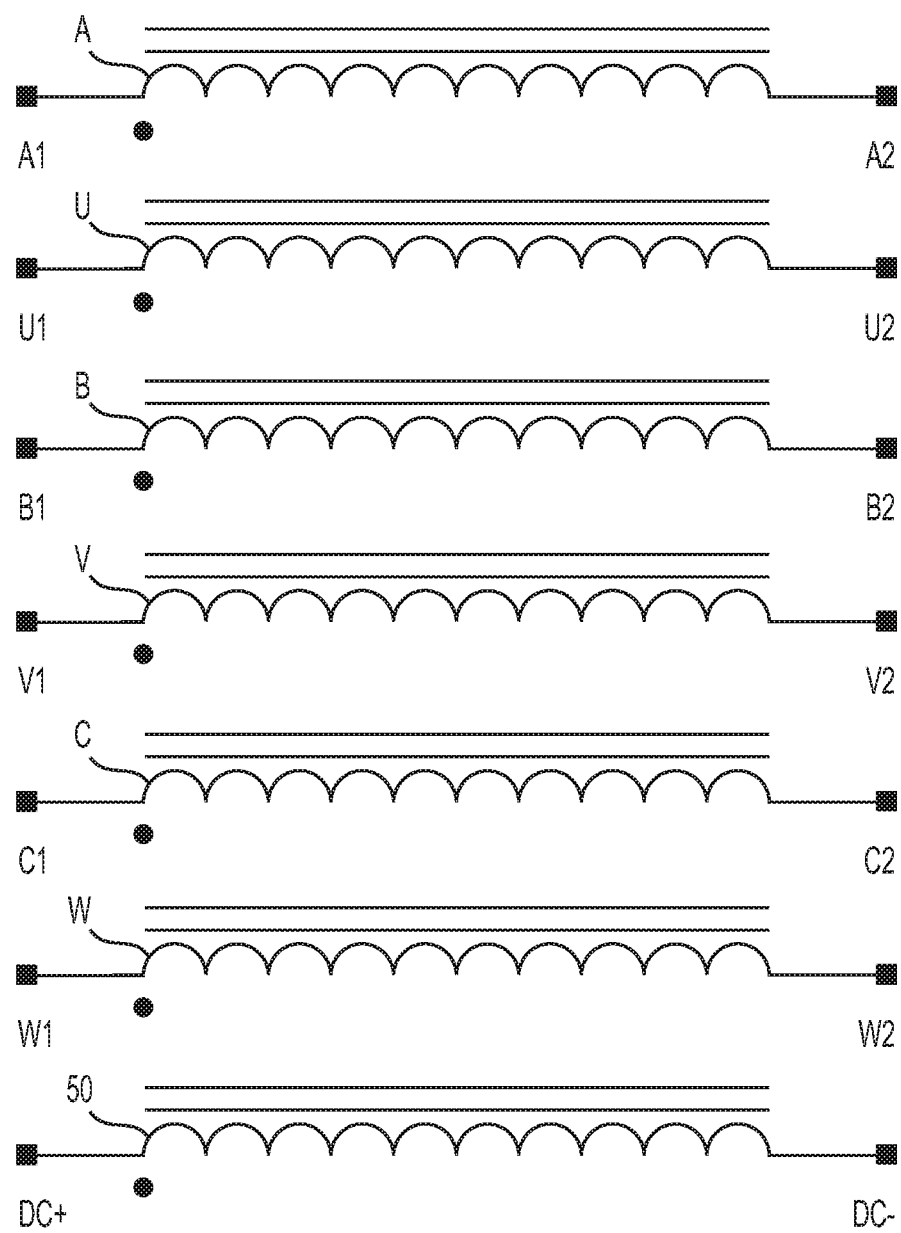
FIG. 2 is a schematic diagram of the windings of a hybrid excitation machine of the embodiment of FIG. 1.

As shown in the schematic diagram of FIG. 2, the hybrid excitation machine 22 may have multiple phases such as 3, 6, or 9, through which AC current will pass during traction. For example, in a 6-phase machine, each of the windings A, B, C, U, V, W may have a first end A1, B1, C1, U1, V1, W1 and a corresponding second end A2, B2, C2, U2, V2, W2. Only 3 phases may be connected to the utility grid during integrated charging (IC) due to the phase restrictions on the utility grid side. An AC utility line power supply 30, which may, for example, be a 3-phase supply with a line-to-line voltage of 208 VAC and a frequency of 60 Hz, as is common in North America, may be connected to the first end U1, V1, W1 of the first set of windings U, V, W to provide an electrical current to the vehicle through the first set of windings U, V, W. In this way, the first set of windings U, V, W may function as a line reactor. The first set of windings U, V, W may also function in conjunction with a multi-phase AC-DC converter 34 to boost the voltage from the utility line power supply 30. During IC, the AC current from the utility line power supply 30 may induce a magnetic flux across the air gap 26 and in the rotor 24 of the hybrid excitation machine 22 with the rotor 24 in a stand-still condition. The magnetic flux interacts with the rotor 24 in the traction mode to produce a driving torque on an output shaft 25. The hybrid excitation machine 22 of the present disclosure is configured to reduce the interaction between the magnetic flux and the rotor 24 in the IC mode.

Figure 8:
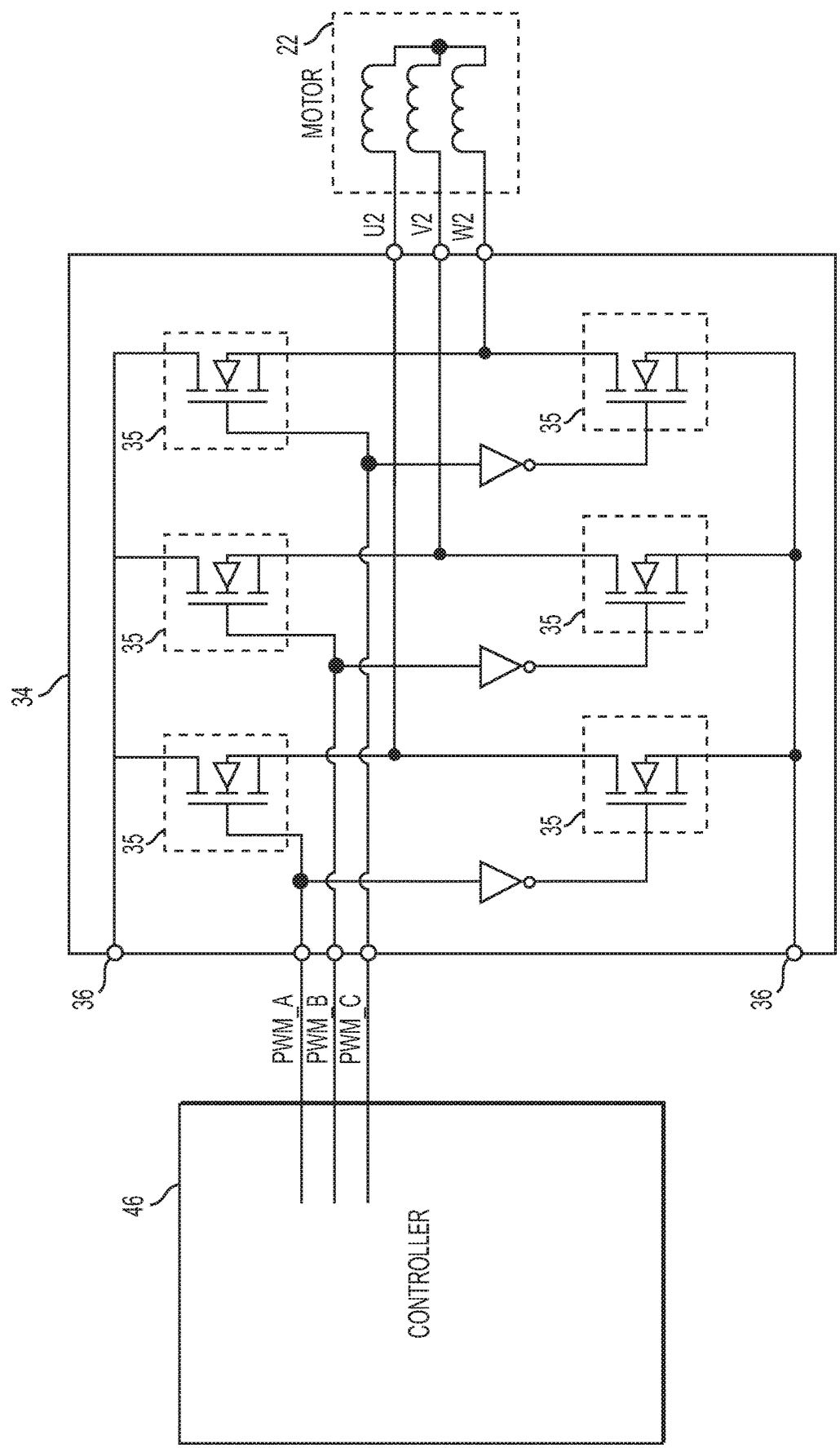
FIG. 8 is a schematic diagram of a 3-phase bi-directional AC-DC converter in accordance with the present disclosure.

The system 20 may include a contactor and/or an isolation transformer 32 to selectively connect the first end U1, V1, W1 of the first set of windings U, V, W to the utility line power supply 30 during IC to protect from fault conditions on either the vehicle power system or on the utility line power supply 30. The second end U2, V2, W2 of the first set of windings U, V, W may connect to a multi-phase AC-DC converter 34, also called a 'machine-side' PWM converter 34, which may include power electronics switches 35 to provide a high-voltage DC current on a high-voltage DC bus 36. A schematic diagram for an example AC-DC converter 34 is shown in FIG. 8. The AC-DC converter 34 may provide the high-voltage DC bus 36 with a boosted constant DC link voltage which may be greater than the peak voltage of the 3-phase AC utility line power supply 30. The system 20 may also include a DC-DC converter 38, which may also be called a 'battery side' DC/DC boost converter 38, connected between the high-voltage DC bus 36 and a battery bus 40 for converting the high-voltage DC current from the high-voltage DC bus 36 to a different DC voltage on the battery bus 40 for charging a battery pack 42 connected thereto. The DC-DC converter 38 may be a bi-directional DC-DC converter 38, capable of converting between two different DC voltages in either of two different directions depending on the operational mode of the vehicle, such as, for example, to allow for the batteries to be charged or discharged. A filter capacitor 44, which may be a capacitor bank, is connected across the high-voltage DC bus 36 to regulate the voltage thereupon and to absorb any high voltage spikes such as those at harmonic frequencies resulting from the operation of the AC-DC converter 34 and/or the DC-DC converter 38.

An integrated charging controller 46, which may be called an IC controller 46, is in communication with the contactor and/or isolation transformer 32 and with the AC-DC converter 34 for operating the system 20 in the traction mode, with the hybrid excitation machine 22 configured as a traction motor or for operating the system 20 in the IC mode, with the hybrid excitation machine 22 configured for integrated charging. The IC controller 46 may be comprised of two or more separate devices which may be in communication with one-another or which may operate independently. The IC controller 46 may be combined with one or more other controllers in the vehicle and may exist as a module within another controller, such as, for example, a body control module (BCM) or an engine control module (ECM).

According to an aspect, in a multi-phase machine, the second set of windings A, B, C can be connected in parallel with the first set of windings U, V, W to increase the power rating during charging. By passing electrical current through the second set of windings A, B, C in an opposite direction as the electrical current passing through the first set of windings U, V, W, the magnetic flux generated by the electrical current in the second set of windings A, B, C may offset the magnetic flux generated by the electrical current in the first set of windings U, V, W, and vice-versa. Furthermore, and as illustrated in the embodiment of FIGS. 1-2, any windings in the hybrid excitation machine 22 that are idle or not otherwise used during IC may be utilized as a DC winding 50 to carry DC current during IC. According to another aspect, one or more separate DC windings 50 may be provided in the hybrid excitation machine 22 and which are not used to carry AC current at any time. Such dedicated DC windings 50 may be used during both traction and IC modes.

The DC winding 50 in the hybrid excitation machine 22 may be configured to counteract the magnetic flux produced by the first set of windings U, V, W and to thereby reduce the magnetic flux across the air gap 26 and into the rotor 24 of the hybrid excitation machine 22 and to lower the operating point of the permanent magnet, and to thereby reduce the detrimental effects of the magnetic flux such as torque oscillation, mechanical vibration, energy loss, asymmetry in voltages/currents, temperature rise, irreversible demagnetization or weakening of the permanent magnets, etc. In another variation, an extra set of AC windings (for example, A, B, C in a multi-phase machine) and one or more DC windings 50 can be used in conjunction to do the above. The DC winding 50 may include one or two or more separate DC windings 50.

A DC voltage may be applied across the DC winding 50 to actively to counteract the magnetic flux produced by the first set of windings U, V, W. The system 20 may, for example, include a DC power supply 52 configured to apply a DC voltage across the DC winding 50. In another variation, the DC winding 50 can be powered by a regulated DC supply from one of the existing converters 34, 38 by an extra leg, which may include one or more switches. The system 20 may include circuitry that is configured to short-circuit one or more of the DC windings 50 which may provide an alternative pathway for the magnetic flux from the first set of windings U, V, W, thereby reducing the magnetic flux that is available to cross the air gap 26 and to affect the rotor 24 and/or the permanent magnets of the hybrid excitation machine 22.

A combination of the different versions may be employed with the system 20 configured to selectively short-circuit, open-circuit, and/or apply a DC voltage to one or more of the DC windings 50. The system 20 may be configured to quickly switch the configuration of any one of the DC windings 50 to counteract the magnetic flux produced by the first set of windings U, V, W. The system 20 may employ pulse-width modulation (PWM) or another control strategy to control the application of DC voltage, to short-circuit, and/or to open-circuit to any or all of the DC windings 50, together or independently. The IC controller 46 may be configured to control the application of DC voltage, short-circuit, and/or open-circuit to each or all of the DC windings 50.

In other embodiments illustrated in FIGS. 3-6, the rotor 24 of the hybrid excitation machine 22 includes a secondary coil 60, which is configured to be excited by a coupling magnetic field to generate an AC voltage. The rotor 24 also includes a rectifier 62 in electrical communication with the secondary coil 60 for changing the AC voltage to a DC voltage between a DC positive node 64 and a DC negative node 66. The rectifier 62 may include a bridge rectifier having four diodes as shown, however, other designs may be used including a single diode or one or more switching transistors. A smoothing capacitor 68 may be connected between the DC nodes 64, 66 for reducing ripple in the DC voltage.

In the embodiments of FIGS. 3-6, the rotor 24 of the hybrid excitation machine 22 includes a field winding 70 connected between the DC nodes 64, 66 in parallel with the smoothing capacitor 56. The field winding 70 is disposed within the stator 28 and is configured to be excited with the DC voltage in the traction mode, with the field winding 70 interacting with the magnetic flux from the stator windings U, V, W to produce a driving torque on the output shaft 25. The field winding 70 of the rotor 24 is also configured to be de-excited in the IC mode, thereby preventing the rotor 24 from producing the driving torque on the output shaft 25. The rotor 24 preferably has a cylindrical configuration, with the field winding 70 oriented in an axial direction parallel to the output shaft 25.

Figure 3:
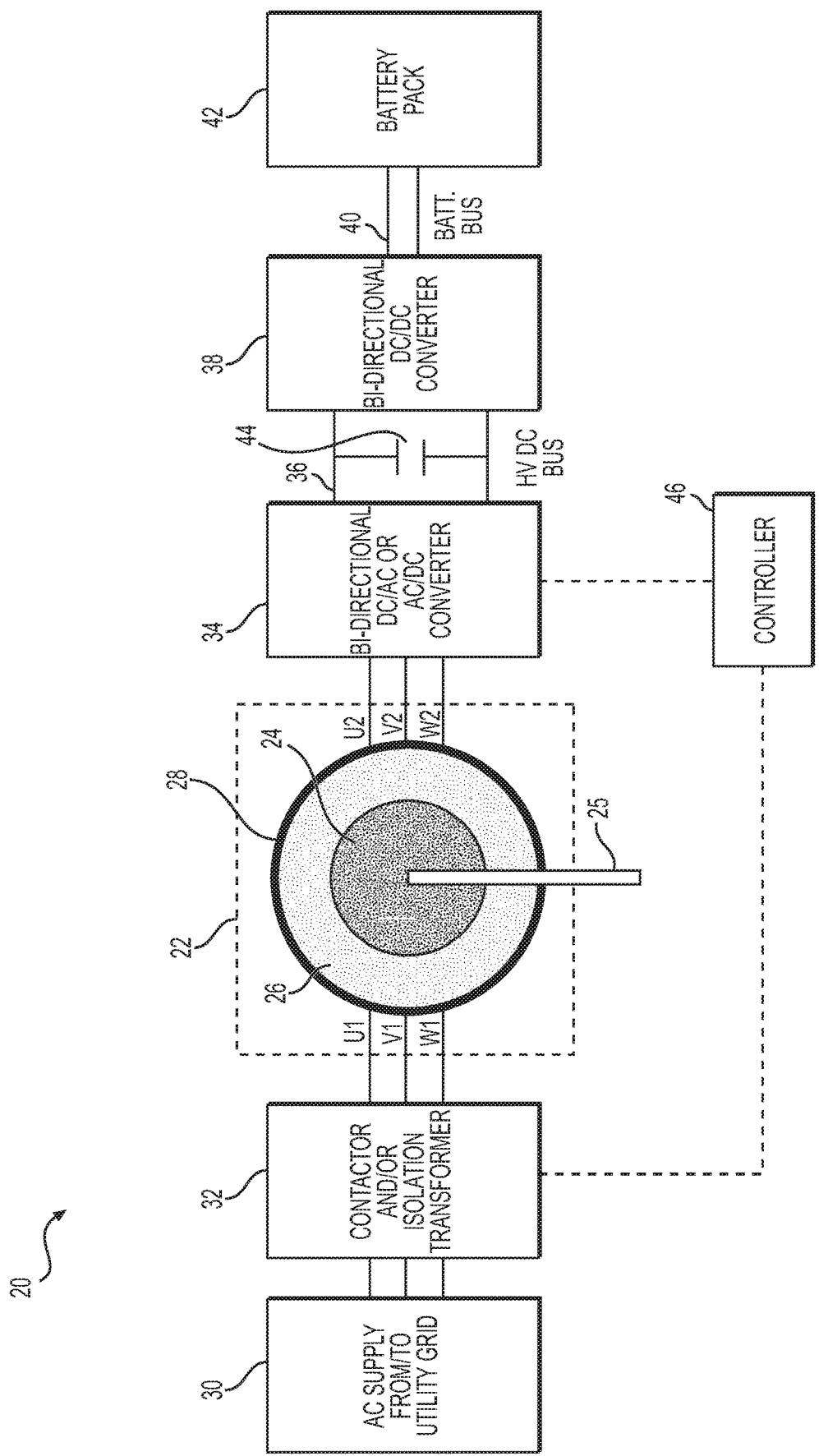
FIG. 3 is a schematic diagram of a system including a hybrid excitation machine having an externally-excited rotor in accordance with another embodiment of the present disclosure.
Figure 4:
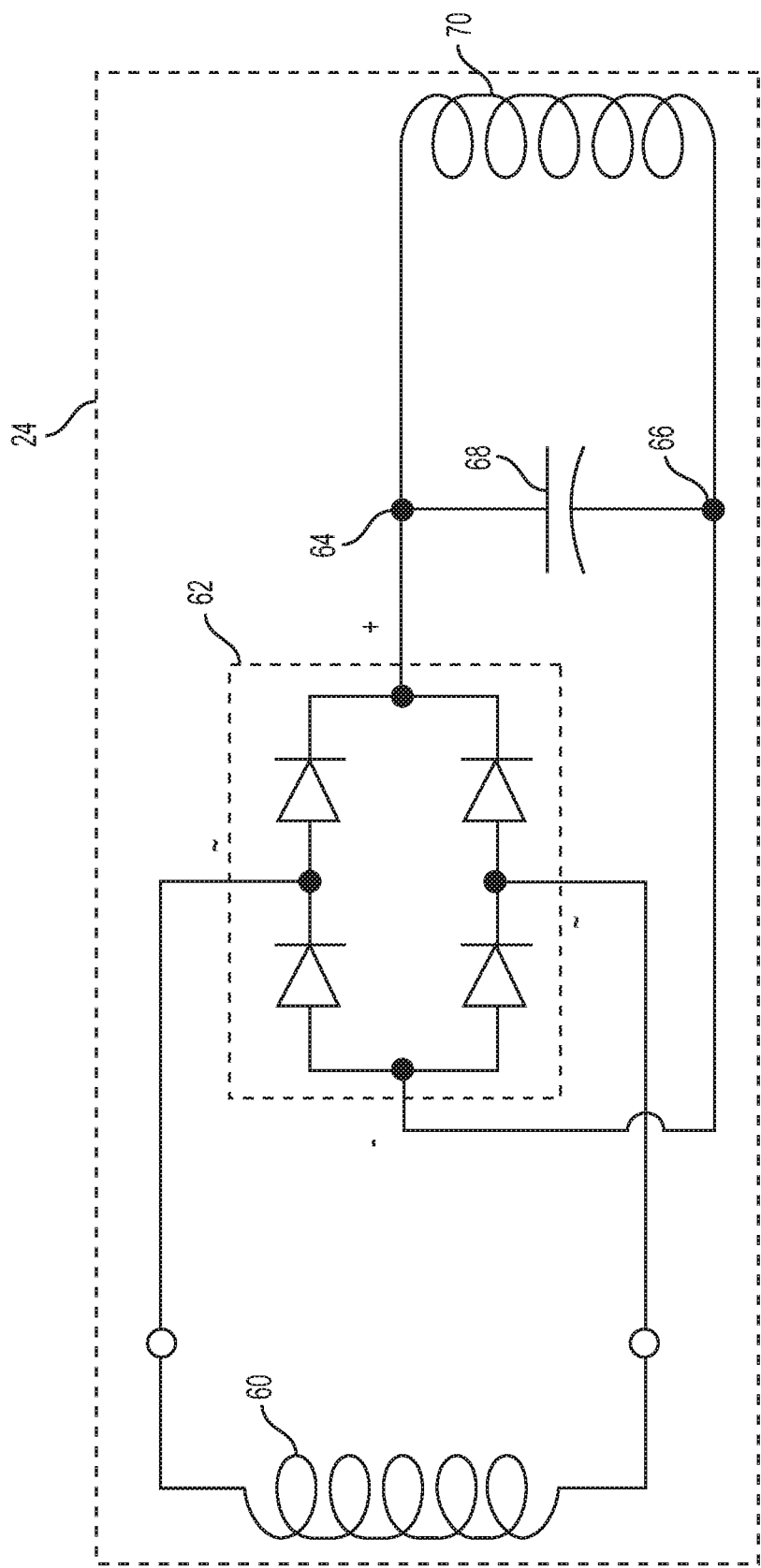
FIG. 4 is a schematic diagram of the self-excited rotor in the embodiment of FIG. 3.

As shown in FIGS. 3 and 4, a "self-excited machine" embodiment of the system 20 for integrated charging includes the rotor 24 being self-excited, with the field winding 70 being in quadrature to the secondary coil 60, with each of the secondary coil 60 and the field winding 70 configured to interact with the magnetic flux from the stator windings U, V, W. In other words, the field winding 70 is disposed 90-degrees out of phase from the secondary coil 60.

In the "self-excited machine" embodiment, the IC controller 46 is configured to operate the power electronics switches 35 in the 3-phase AC-DC converter 34 using field-oriented control, also called vector control, in the traction mode to cause the magnetic flux from the stator windings U, V, W to produce the coupling magnetic field that is aligned with the secondary coil 60 in the rotor 24 to induce the AC voltage therein and to thereby cause the field winding 70 of the rotor 24 to be excited. In other words, the power electronics switches 35 in the 3-phase AC-DC converter 32 may be controlled to produce a zero-sequence current in the rotor to selectively excite or to de-excite the field winding 70 of the rotor 24. The IC controller 46 operates the power electronics switches 35 in the 3-phase AC-DC converter 34 using field-oriented control in the IC mode to cause the magnetic flux from the stator windings U, V, W to produce a magnetic field that is out of phase from the secondary coil 60 in the rotor 24 to prevent the induction of AC voltage therein and to thereby cause the field winding 70 of the rotor 24 to be de-excited.

Figure 5:
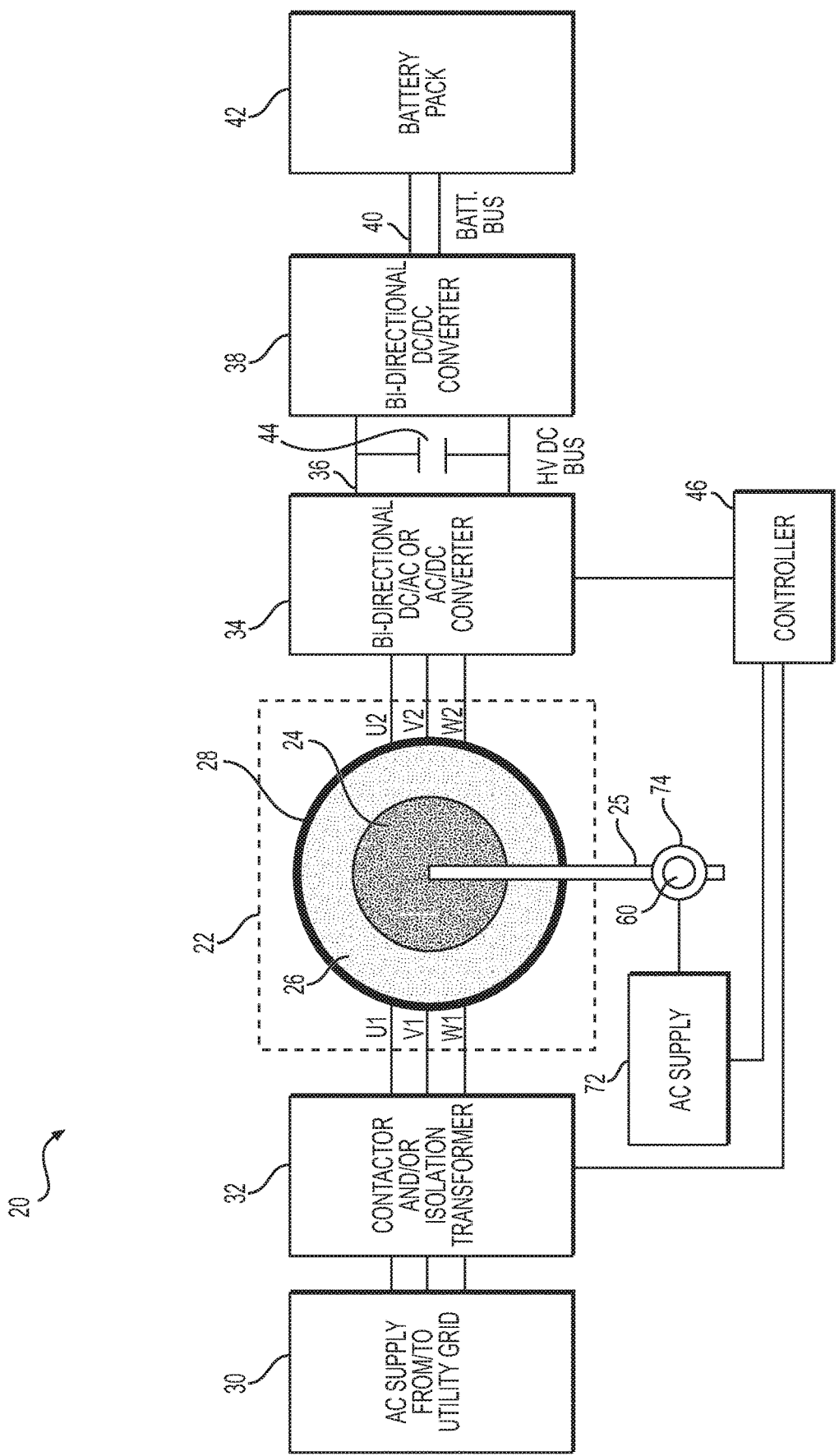
FIG. 5 is a schematic diagram of a system including a hybrid excitation machine having an externally-excited rotor in accordance with another embodiment of the present disclosure.
Figure 6:
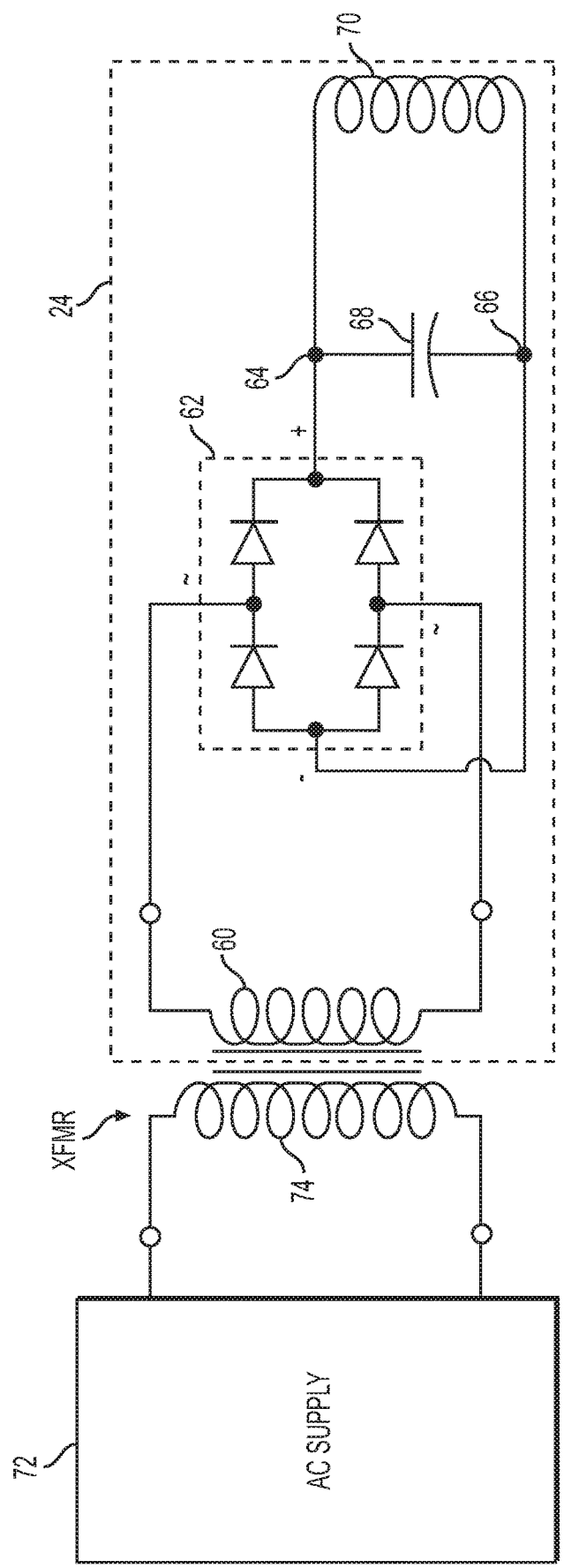
FIG. 6 is a schematic diagram of the externally-excited rotor in the embodiment of FIG. 5.
Figure 7:
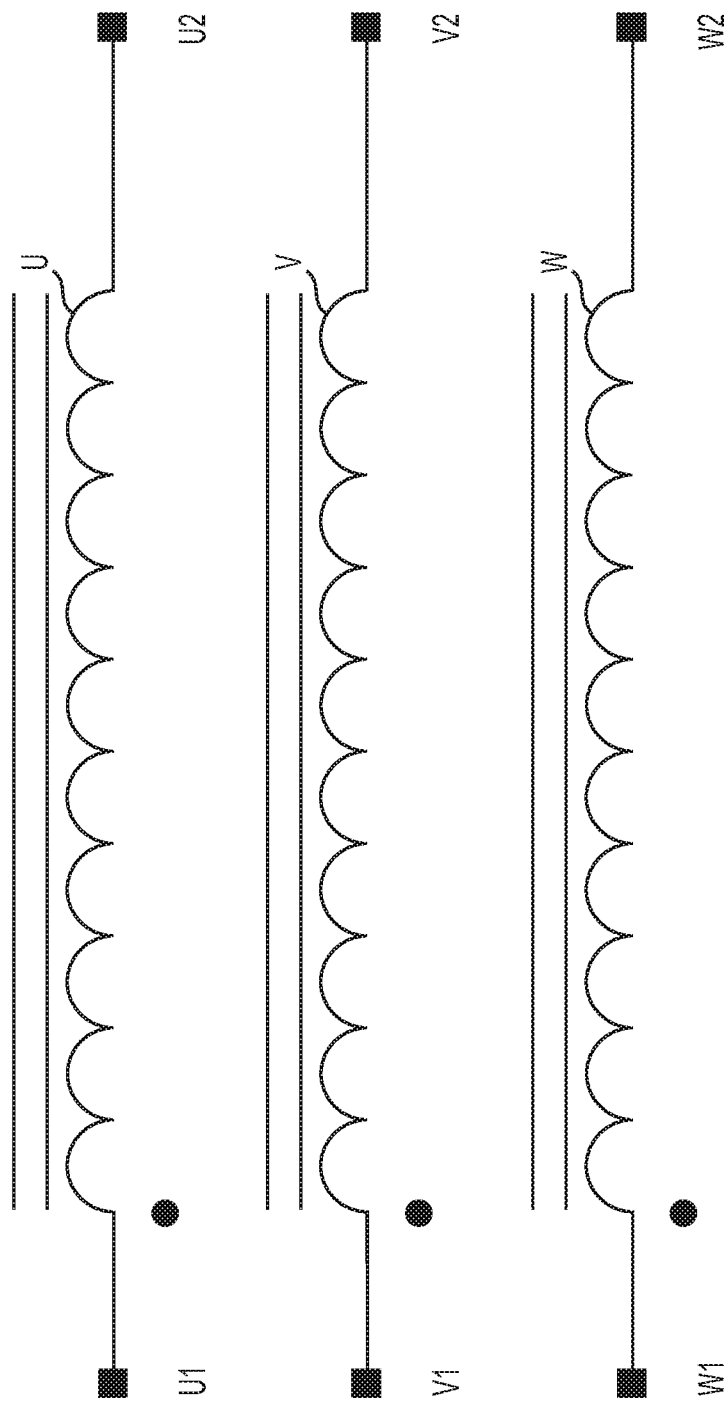
FIG. 7 is a schematic diagram of stator windings in accordance with the embodiments of FIGS. 3 and 5

As shown in FIGS. 5 and 6, an "externally-excited machine" embodiment of the system 20 for integrated charging includes the secondary coil 60 being magnetically coupled with a primary coil 74 powered by an AC current from an AC supply 72, to cause the field winding 70 of the rotor 24 to be excited in the traction mode. In other words, and as illustrated in FIG. 6, the primary coil 60 and the secondary coil 60 together function as a rotary transformer, with the primary coil 60 being stationary and the secondary coil 60 rotating with the rotor 24 to inductively transfer power from the AC supply 62 to the rotor 24. As shown in FIG. 3, the secondary coil 60 is isolated from the magnetic flux from the stator windings U, V, W, for example, by being axially spaced outside of the stator.

As shown in FIG. 5, the IC controller 46 is in communication with the AC supply 72, and causes the AC supply 72 to be enabled in the traction mode to excite the field winding 70 of the rotor 24. Likewise, the IC controller 46 disables the AC supply 72 in the IC mode to de-excite the field winding 70 of the rotor 24.

Figure 9B:
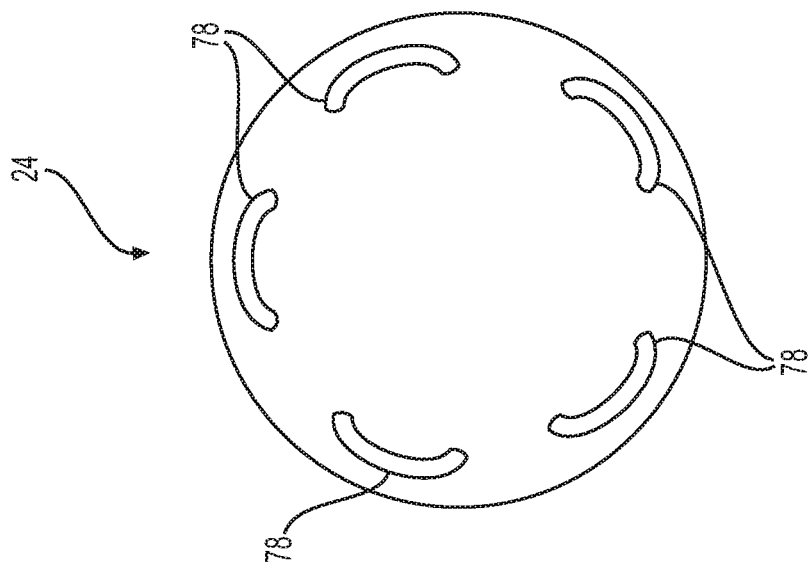
FIG. 9B is a side view of a rotor of a hybrid excitation machine in accordance with an another embodiment of the present disclosure.
Figure 9A:
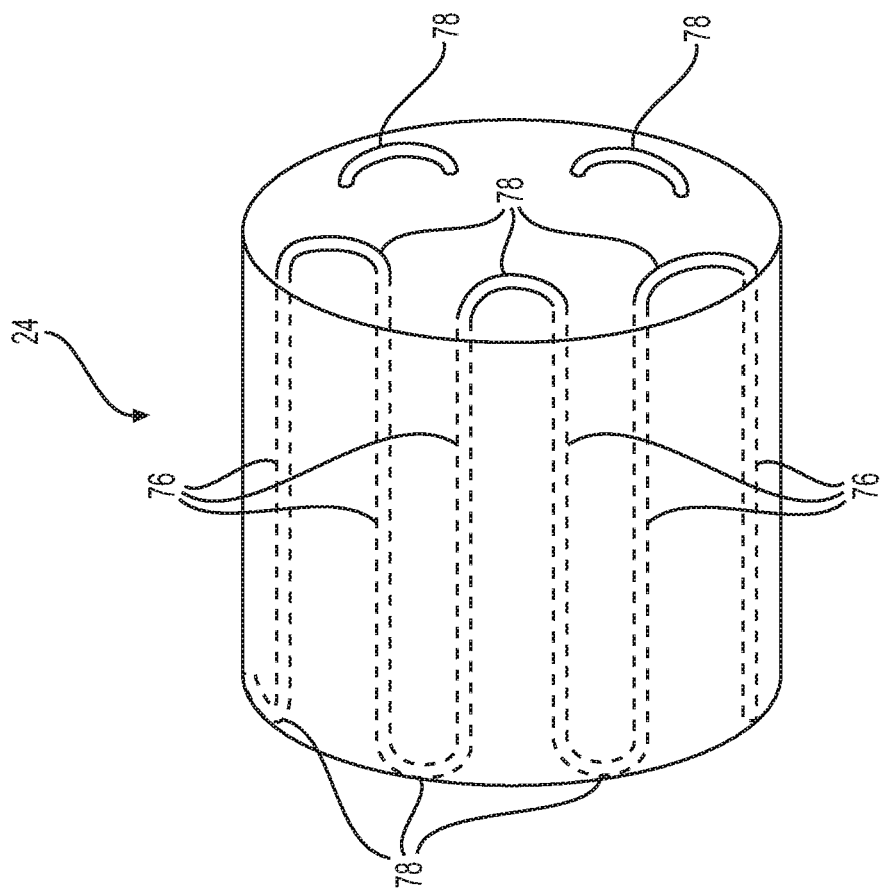
FIG. 9A is a side view of a rotor of a hybrid excitation machine in accordance with an another embodiment of the present disclosure.
Figure 10:
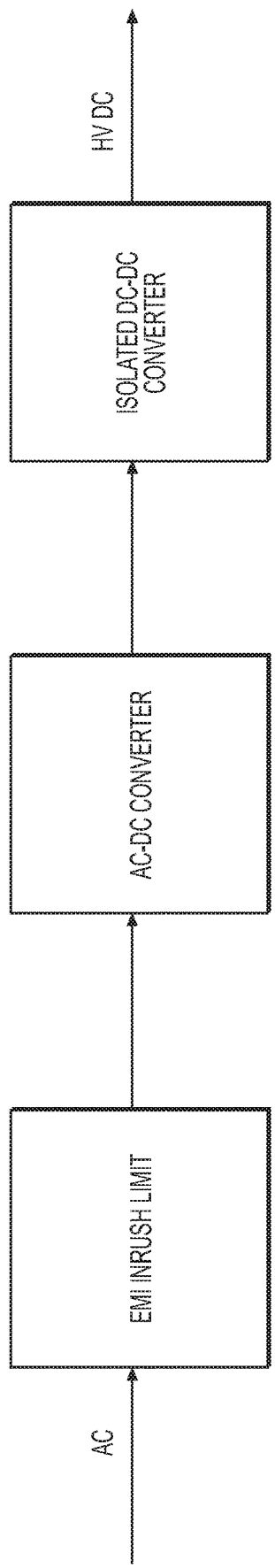
FIG. 10 is a block diagram of a conventional onboard charger of the prior art.
Figure 11:
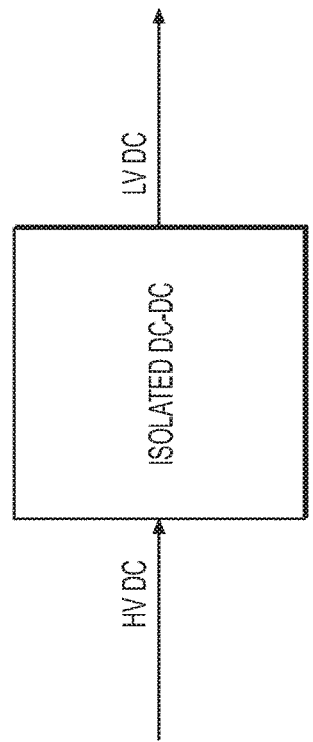
FIG. 11 is a block diagram of a DC/DC converter of the prior art.

In the embodiment shown in FIGS. 9A and 9B, the rotor 24 is generally cylindrical and contains permanent magnets (not shown) and rotor bars 76 extending axially within the rotor 24. Each of the rotor bars 76 is electrically shorted to the next adjacent one of the rotor bars 76 by a jumper conductor 78 at each axial end thereof, with all of the rotor bars 76 connected together in a series configuration and forming a closed loop. Electrical current induced in each of the rotor bars 76 flows in alternating axial directions, and fluxes produced by each rotor bar 76 are cancelled. In other words, electrical current in each of the rotor bars 76 flows in a direction opposite to the electrical current in the next adjacent ones of the rotor bars 76. Therefore, the resultant torque due to the rotor bars 76 will be zero during integrated charging. The rotor bars 76 come into effect during steady-state traction operation of the hybrid excitation machine 22, particularly in response to sinusoidal back electromotive force (back EMF), and with little to no harmonics being present. The embodiment shown in FIGS. 9A and 9B includes ten (10) of the rotor bars 76 and five (5) of the jumper conductors 78 at each axial end of the rotor 24. However, a different number of rotor bars 76 and jumper conductors 78 may be used, and the number of rotor bars 76 may depend on the number of poles within the hybrid excitation machine 22.

Figure 12A:
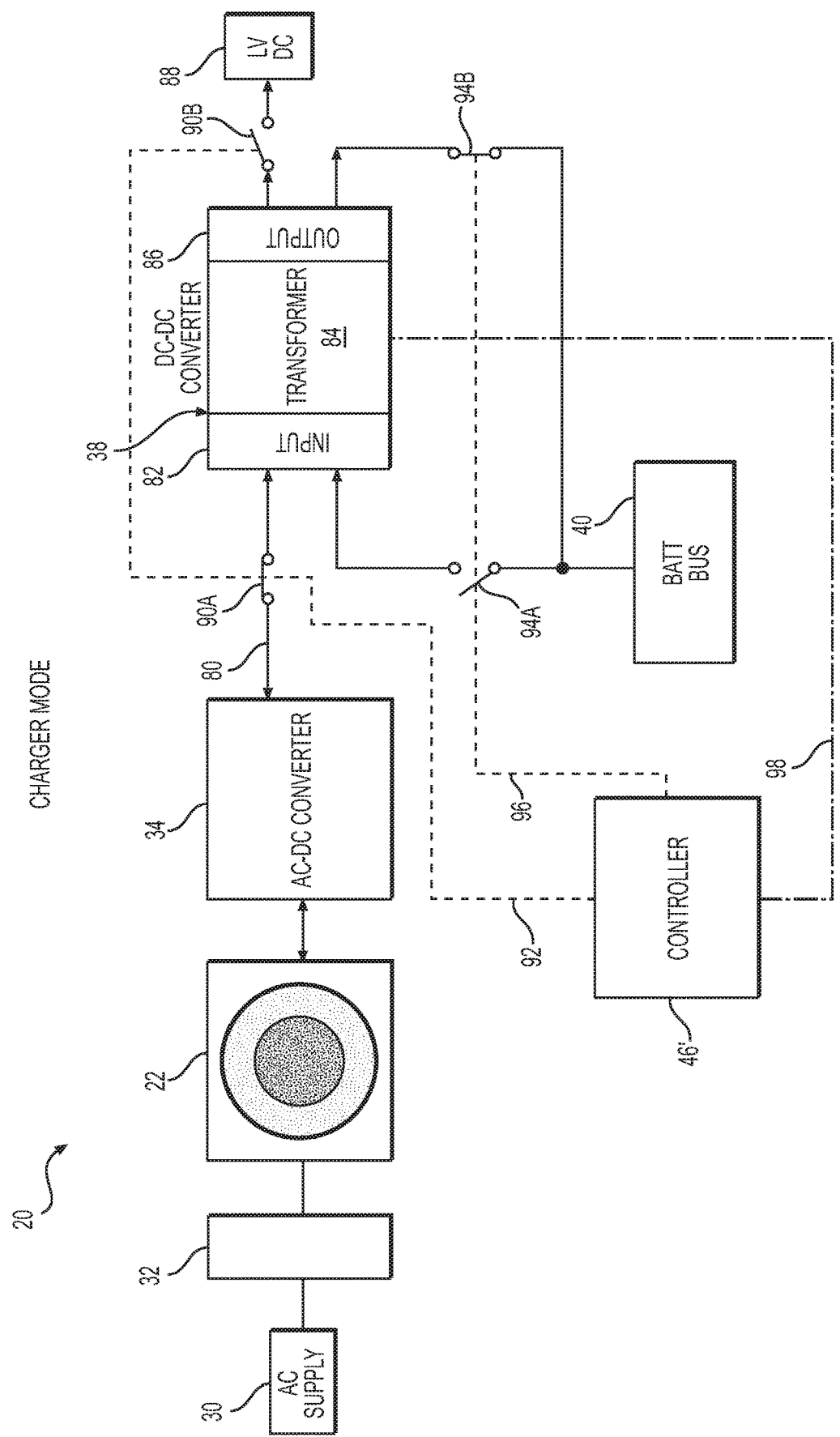
FIG. 12A is a block diagram of a system including a combined DC/DC converter and charger in a charger mode.
Figure 12B:
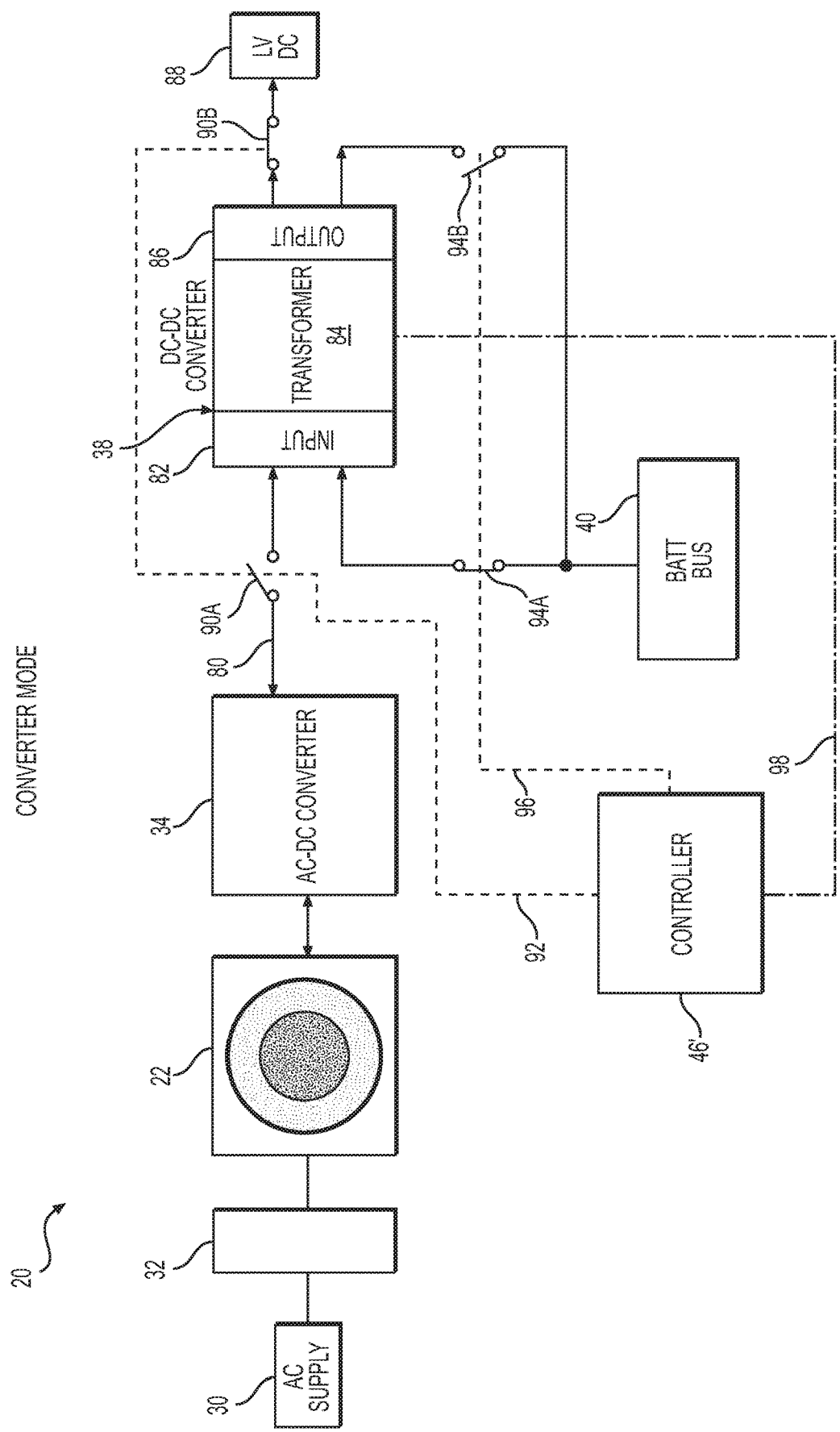
FIG. 12B is a block diagram of the system including a combined DC/DC converter and charger in a converter mode.

According to a further aspect of the disclosure and as illustrated in FIGS. 12A-12B, the system 20 further includes using the DC-DC converter 38 in either of two different modes as a combined DC/DC converter and charger.

As shown in FIGS. 12A and 12B, the DC-DC converter 38 includes an input stage 82 for generating a first AC voltage from an input DC voltage, and a transformer stage 84 for converting that first AC voltage to a second AC voltage, and an output stage 86 for converting the second AC voltage to an output DC voltage different than the input DC voltage. The output DC voltage may be the same as or different from the input DC voltage. The DC-DC converter 38 may be a one-phase or multiple-phase interleaved LLC resonant converter, or LCLC type with or without a switch-controlled capacitor. The DC-DC converter 38 could also be half bridge or full bridge. Switches in the DC-DC converter 38 could be IGBT, Mosfet, GaN or SiC. Diodes may be Silicon or Silicon Carbide (SiC) type. The transformer stage 84 could be wound or planar type. The DC-DC converter 38 may also provide electrical isolation between the input DC voltage and the output DC voltage. Two or more windings in the hybrid excitation machine 22 may be used as the transformer stage 84 of the DC-DC converter 38 and/or to provide electrical isolation.

The battery bus 40 is energized with a first DC voltage, which may be 48 VDC. The battery bus 40 may also be connected to one or more high voltage (HV) DC devices such as, for example, a high capacity battery pack, and/or a speed controller for one or more traction motors. A second DC bus 88, energized with a second DC voltage different than the first DC voltage of the battery bus 40. The second DC bus 88 may also be called a low-voltage (LV) DC bus 88. The second DC bus 88 may provide, for example, a low-voltage for powering low-voltage devices, such as vehicle accessories, which may operate, for example, at 12 to 14 VDC to match the voltage commonly used in vehicles having lead-acid batteries. The second DC bus 88 may supply a relatively large amount of power which may be, for example, 100 W or greater.

A converter-charger controller 46' controls the operation of the combined DC/DC converter and charger 10. The converter-charger controller 46' may be dedicated to the combined DC/DC converter and charger, or it may be shared with one or more systems in the vehicle. For example, the converter-charger controller 46' may be integrated with the IC controller 46 and/or with another controller in the vehicle. The converter-charger controller 46' is operable to command a first switch 90A via a first control channel 92 to selectively connect the intermediate DC conductor 80 to permit the AC-DC converter 34 to transmit electrical power to the input stage 82 of the DC-DC converter 38 in a first mode, also called a "charger mode," as illustrated in FIG. 12A, or to or inhibit the AC-DC converter 34 from transmitting electrical power to or from the input stage 82 of the DC-DC converter 38 in a second mode, also called a "converter mode," as illustrated in FIG. 12B. The controller 46' may be programmed to operate the combined DC/DC converter and charger 10 in either the first mode, as a charger, or in the second mode as a DC/DC converter when necessary. For example, the converter-charger controller 46' may automatically switch to the second mode after the high-capacity HV battery is completely charged. This may allow a low-voltage battery to be charged and may also provide low voltage power to other devices within the vehicle if necessary.

The converter-charger controller 46' is also operable to command a second switch 90B to selectively connect the output stage 86 of the DC-DC converter 38 to the second DC bus 88 to inhibit the output stage 86 of the DC-DC converter 86 from conveying electrical power to or from the second DC bus 88 in the first mode or to or permit the output stage 86 of the DC-DC converter 38 to transmit electrical power to the second DC bus 88 in the second mode. The first switch 90A and the second switch 90B are preferably linked, as shown in the figures, preventing the second DC bus 88 from ever being connected to the DC-DC converter 38 at the same time that the intermediate DC conductor 80 is connected to the DC-DC converter 38. This configuration allows the first switch 38A and the second switch 38B to share a common first control channel 39, although those switches 38A, 38B could be controlled independently.

The controller 46' is also operable to command a third switch 94A, via a second control channel 96, to selectively connect the battery bus 40 to the input stage 82 of the DC-DC converter 38, inhibiting the battery bus 40 from transmitting electrical power to or from the input stage 82 of the DC-DC converter 38 in the first mode or to or permit the battery bus 40 to transmit electrical power to the input stage 82 of the DC-DC converter 38 in the second mode.

The controller 46' is also operable to command a fourth switch 94B to selectively connect the output stage 86 of the DC-DC converter 38 to the battery bus 40 to permit the output stage 86 of the DC-DC converter 38 to convey electrical power to the battery bus 40 in the first mode or to or inhibit the output stage 86 of the DC-DC converter 38 from conveying electrical power to or from the battery bus 40 in the second mode. The third switch 94A and the fourth switch 94B are preferably linked, as shown in the figures, preventing the battery bus 40 from ever being connected to both the input stage 82 and the output stage 86 of the DC-DC converter 38 at the same time. This configuration allows the first switch 94A and the second switch 94B to share a common second control channel 96, although those switches 94A, 94B could be controlled independently.

Switches 90A, 90B and 94A may be closed at the same time to simultaneously charge HV and LV batteries and/or to supply LV devices connected to the second DC bus 88.

The controller 46' is also operable to command the DC-DC converter 38 via a third control channel 98 to output a specified DC voltage at the output stage 86. This may include using one or more different windings within the transformer 84, and/or varying the output of a voltage regulation circuit within the transformer 84 or the output stage 86.

Figure 13:
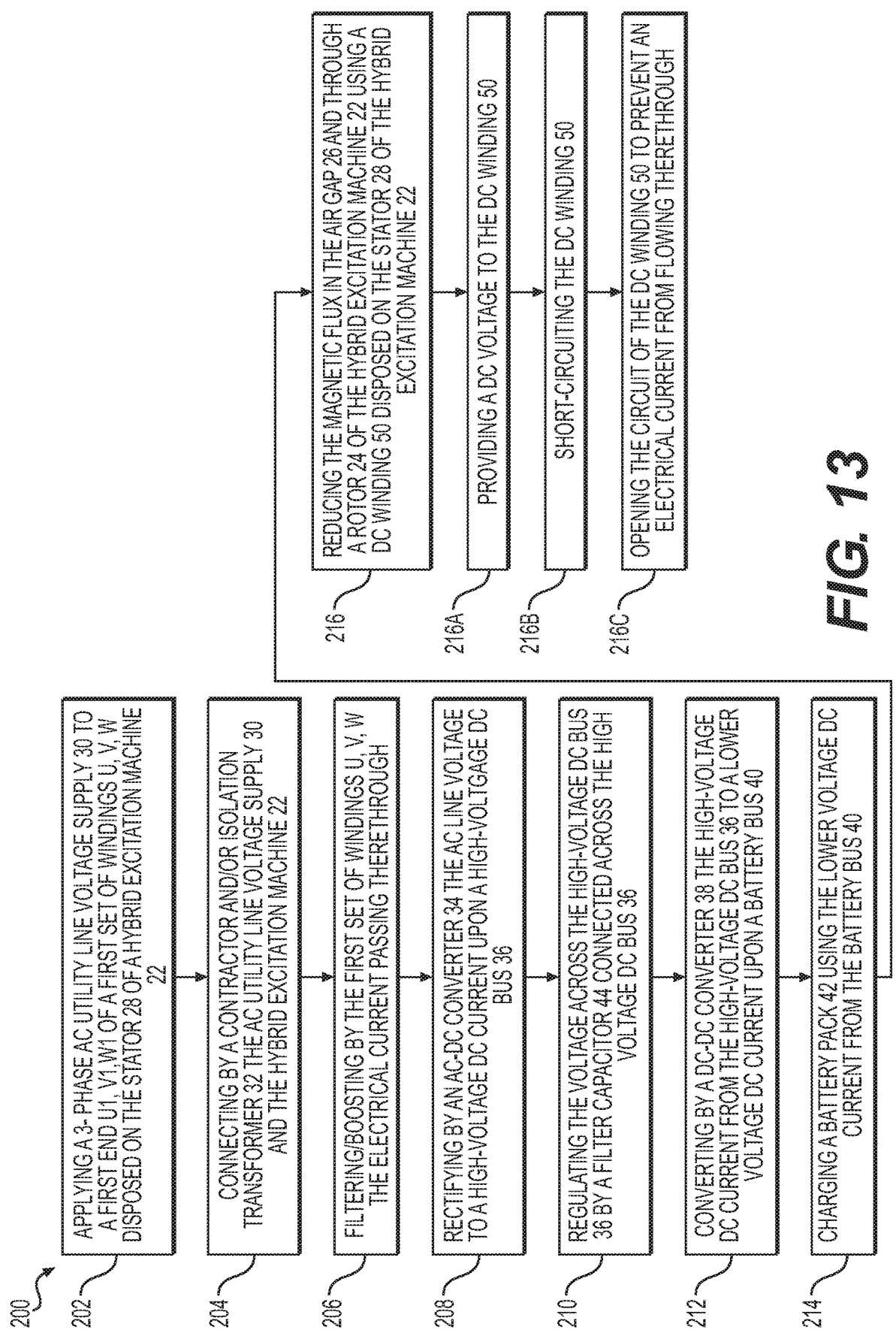
FIG. 13 is a flow chart of a first method in accordance with the present disclosure.

As shown in FIG. 13, a first method 200 for integrated charging an electric vehicle is provided. The first method 200 includes applying a 3-phase AC utility line power supply 30 to a first end U1, V1, W1 of a first set of windings U, V, W disposed on a stator 28 of a hybrid excitation machine 22 at step 202.

The first method 200 also includes connecting by a contactor and/or isolation transformer 32, the 3-phase AC utility line power supply 30 to the first end U2, V2, W2 of the first set of windings U, V, W at step 204.

The first method 200 also includes filtering/boosting by the first set of windings U, V, W the electrical current passing therethrough at step 206.

The first method 200 also includes rectifying by an AC-DC converter 34, the AC line voltage to a high-voltage DC current upon a high-voltage DC bus 36 at step 208.

The first method 200 also includes regulating the voltage across the high-voltage DC bus 36 by a filter capacitor 44 connected across the high-voltage DC bus 36 at step 210.

The first method 200 also includes converting by a DC-DC converter 38 the high-voltage DC current from the high-voltage DC bus 36 to a lower voltage DC current upon a battery bus 40 at step 212.

The first method 200 also includes charging a battery pack 42 using the lower voltage DC current from the battery bus 40 at step 214.

The first method 200 also includes reducing the magnetic flux in the air gap and through a rotor 24 of the hybrid excitation machine 22 using a DC winding 50 disposed on the stator at step 216. This step may also include lowering the operating point of one or more permanent magnets within the hybrid excitation machine 22 if the hybrid excitation machine 22 is so equipped. Different versions of step 216 are disclosed, and which may be used independently and/or in conjunction with one another. Those versions include 216A Providing a DC voltage to the DC winding 50 using a DC power supply 52; 216B short-circuiting the DC winding 50 by connecting its respective ends to one another, i.e. DC+ to DC−; and 216C opening the circuit of the DC winding 50 to prevent an electrical current from flowing therethrough.

As shown in FIGS. 14A-14B, a second method 300 for integrated charging an electric vehicle is provided. The second method 300 includes applying a 3-phase AC utility line power supply 28 to a first end U1, V1, W1 of a set of stator windings U, V, W of a hybrid excitation machine 22 at step 302.

The second method 300 also includes connecting by a contactor and/or isolation transformer 32 the 3-phase AC utility line power supply 30 to the first end U2, V2, W2 of the stator windings U, V, W at step 304.

The second method 300 also includes filtering/boosting by the stator windings U, V, W the electrical current passing therethrough at step 306.

The second method 300 also includes rectifying by a bi-directional AC-DC converter 34, the AC line voltage to a high-voltage DC current upon a high-voltage DC bus 36 at step 308.

The second method 300 also includes regulating the voltage across the high-voltage DC bus 36 by a filter capacitor 44 connected across the high-voltage DC bus 36 at step 310.

The second method 300 also includes converting by a DC-DC converter 38, the high-voltage DC current from the high-voltage DC bus 36 to a lower voltage DC current upon a battery bus 40 at step 312.

The second method 300 also includes charging a battery pack 42 using the lower voltage DC current from the battery bus 40 at step 314.

The second method 300 also includes selectively exciting a field winding 70 in the rotor 24 of the hybrid excitation machine 22 in a traction mode at step 316.

The second method 300 also includes de-exciting the field winding 70 in the rotor 24 of the hybrid excitation machine 22 in an IC mode at step 318. Step 318 is performed while simultaneously applying the 3-phase AC utility line power supply 30 to the first end U1, V1, W1 of the stator windings U, V, W inducing the magnetic flux in the rotor 24 of the hybrid excitation machine 22. Steps 316 and 318 are alternatives that correspond to the two different operating modes and are performed at different times.

As shown in FIG. 14B, step 316 includes several sub-steps including energizing a secondary coil 60 in the rotor 24 with an AC voltage at sub-step 316A; rectifying the AC voltage to a DC voltage between DC nodes 64, 66 by a rectifier 62 at sub-step 316B; reducing ripple in the DC voltage by a smoothing capacitor 56 connected between the DC nodes 64, 66 at sub-step 316C; and exciting the field winding 70 of the rotor 24 with the DC voltage for interacting with the magnetic flux from the stator windings U, V, W to produce a driving torque on an output shaft 25 at sub-step 316D.

In the "self-excited machine" embodiment of the system 20 illustrated in FIGS. 3 and 4, and in the traction mode, step 316 further includes switching a plurality of power electronics switches 35 in the bi-directional DC-AC converter 34 using field-oriented control to cause a magnetic flux from the stator windings U, V, W to produce a coupling magnetic field aligned with the secondary coil 60 in the rotor 24 to induce the AC voltage therein at sub-step 316E.

In the IC mode, the "self-excited machine" embodiment of the system 20, step 318 further includes switching a plurality of power electronics switches 35 in the bi-directional DC-AC converter 34 using field-oriented control to cause a magnetic flux from the stator windings U, V, W to produce a coupling magnetic field that is out of phase from the secondary coil 60 in the rotor 24 to prevent the induction of AC voltage therein and to thereby cause the field winding 70 of the rotor 24 to be de-excited at sub-step 318A.

In the "externally-excited machine" embodiment of the system 20 illustrated in FIGS. 5 and 6, and in the traction mode, step 316 further includes energizing a primary coil 74 using an AC supply 72, with the primary coil 74 being magnetically coupled with the secondary coil 60 at sub-step 316F.

In the IC mode, the "externally-excited machine" embodiment of the system 20, step 318 further includes de-energizing the AC supply 72 to the primary coil 74 at sub-step 318B This sub-step 318B may be performed by commanding the AC supply 72 to stop, by removing a power source to the AC supply 72 or by disconnecting the electrical connection between the AC supply 72 and the primary coil 74.

Figure 15A:
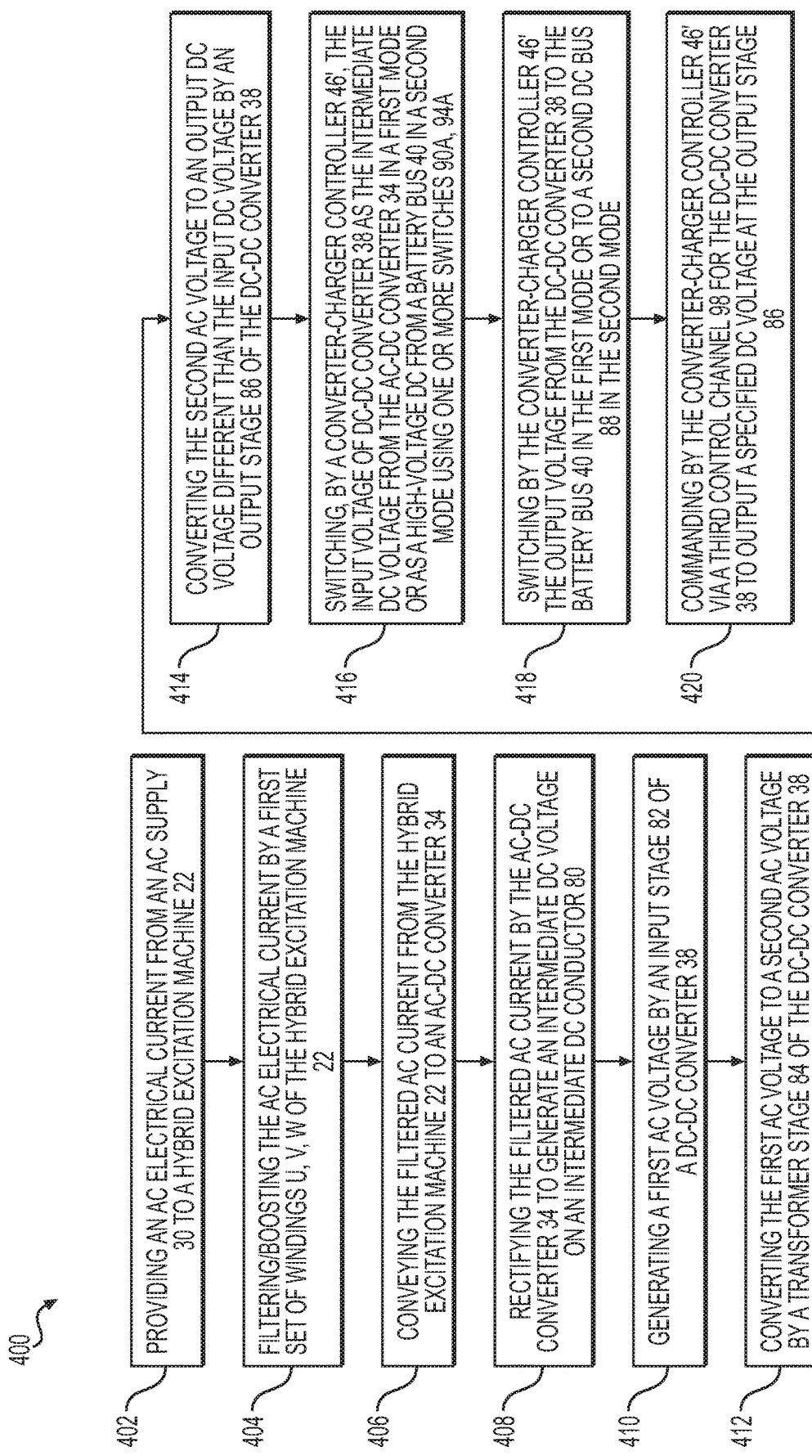
FIG. 15A is a flow chart of a third method in accordance with the present disclosure.

As shown in FIGS. 15A-15C, a third method 400 for integrated charging an electric vehicle is provided. The third method 400 includes providing an AC electrical current from an AC supply 30 to a hybrid excitation machine 22 at step 402.

The third method 400 includes filtering and/or boosting the AC electrical current by a first set of windings U, V, W of the hybrid excitation machine 22 at step 404.

The third method 400 includes conveying the filtered AC current from the hybrid excitation machine 22 to an AC-DC converter 34 at step 406.

The third method 400 includes rectifying the filtered AC current by the AC-DC converter 34 to generate an intermediate DC voltage on an intermediate DC conductor 80 at step 408.

The third method 400 includes generating a first AC voltage by an input stage 82 of a DC-DC converter 38 at step 410. This step 410 includes taking an input DC voltage to generate the first AC voltage, for example, by PWM switching.

The third method 400 includes converting the first AC voltage to a second AC voltage by a transformer stage 84 of the DC-DC converter 38 at step 412. Step 412 may be performed using a stand-alone transformer or by using one or more windings in a traction motor such as one or more of the windings A, B, C, U, V, W in the hybrid excitation machine 22.

The third method 400 includes converting the second AC voltage to an output DC voltage different than the input DC voltage by an output stage 86 of the DC-DC converter 38 at step 414. The output DC voltage may be higher, lower, or the same as the input DC voltage. The output DC voltage may be electrically isolated from the input DC voltage.

The third method 400 includes switching, by a converter-charger controller 46', the input voltage of DC-DC converter 38 as the intermediate DC voltage from the AC-DC converter 34 in a first mode or as a high-voltage DC from a battery bus 40 in a second mode using one or more switches 90A, 94A at step 416.

As shown in FIG. 15B, step 416 may include sub-steps 416A commanding by the converter-charger controller 46' for a first switch 90A to connect the intermediate DC conductor 80 to the input stage 82 of the DC-DC converter 38 in a first mode or for the first switch 90A to isolate the intermediate DC conductor 80 from the input stage 82 of the DC-DC converter 38 in a second mode; and 416B connecting, by the first switch 90A, the intermediate DC conductor 80 to the input stage 82 of the DC-DC converter 38 in the first mode; and 416C isolating, by the first switch 90A, the intermediate DC conductor 80 from the input stage 26 of the DC-DC converter 38 in the second mode.

As shown in FIG. 15B, step 416 may also include sub-steps 416D commanding by the converter-charger controller 46' for a third switch 94A to isolate the input stage 82 of the DC-DC converter 38 from a battery bus 40 in the first mode or for the first switch 94A to connect the input stage 82 of the DC-DC converter 38 with the battery bus 40 in the second mode; and 416E isolating, by the third switch 94A, the input stage 82 of the DC-DC converter 38 from the battery bus 40 in the first mode; and 416F connecting, by the third switch 94A, the input stage 82 of the DC-DC converter 38 with the battery bus 40 in the second mode.

The third method 400 includes switching by the converter-charger controller 46', the output voltage from the DC-DC converter 38 to the battery bus 40 in the first mode or to a second DC bus 88 in the second mode at step 418.

As shown in FIG. 15C, step 418 may include sub-steps 418A commanding by the converter-charger controller 46' for a second switch 80B to isolate the output stage 86 of the DC-DC converter 38 from a second DC bus 88 in the first mode or for the second switch 80B to connect the output stage 86 of the DC-DC converter 38 with the second DC bus 88 in the second mode; and 418B isolating, by the second switch 90B, the output stage 86 of the DC-DC converter 38 from the second DC bus 88 in the first mode; and 418C connecting, by the second switch 90B, the output stage 86 of the DC-DC converter 38 with the second DC bus 88 in the second mode.

As shown in FIG. 15C, step 418 may also include sub-steps 418D commanding by the converter-charger controller 46' for a fourth switch 94B to connect the output stage 86 of the DC-DC converter 38 with the battery bus 40 in the first mode or for the fourth switch 94B to isolate the output stage 30 of the DC-DC converter 24 from the battery bus 40 in the second mode; and 418E connecting, by the fourth switch 94B, the output stage 86 of the DC-DC converter 38 with the battery bus 40 in the first mode; and 418F isolating, by the fourth switch 94B, the output stage 86 of the DC-DC converter 38 from the battery bus 40 in the second mode.

As shown in FIG. 15A, the method 400 also includes commanding by the converter-charger controller 46' via a third control channel 98 for the DC-DC converter 38 to output a specified DC voltage at the output stage 86 at step 420.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for integrated charging an electric vehicle, the system comprising:
   a hybrid excitation machine operable in a traction mode as a traction motor or in an integrated charging (IC) mode and including a rotor separated by an air gap from a stator having a set of AC stator windings to conduct an AC electrical current;
   said set of AC stator windings configured to conduct the AC electrical current from an AC utility line voltage supply in the IC mode and for filtering and/or boosting an AC voltage therefrom;
   said AC electrical current in said set of AC stator windings inducing a magnetic flux across said air gap and in said rotor with the AC electrical current flowing therethrough;
   wherein the magnetic flux interacts with said rotor in the traction mode to produce a driving torque; and
   wherein said hybrid excitation machine is configured to reduce an interaction between the magnetic flux and said rotor in the IC mode.

2. The system for integrated charging an electric vehicle according to claim 1, wherein said stator of said hybrid excitation machine further includes a DC winding configured to carry a DC current to reduce the magnetic flux across said air gap and into said rotor.

3. The system for integrated charging an electric vehicle according to claim 2, wherein said DC winding includes two or more DC windings.

4. The system for integrated charging an electric vehicle according to claim 2, further including a DC power supply configured to apply a DC voltage across said DC winding to reduce the magnetic flux across said air gap and to reduce the magnetic flux into said rotor.

5. The system for integrated charging an electric vehicle according to claim 2, further including circuitry to cause said DC winding to be in one of an open circuit configuration or a short circuit configuration to reduce the magnetic flux across said air gap and to reduce the magnetic flux through said rotor.

6. The system for integrated charging an electric vehicle according to claim 1 wherein said rotor includes a permanent magnet.

7. The system for integrated charging an electric vehicle according to claim 6, further including:
   said rotor including a secondary coil configured to be excited by a coupling magnetic field to generate an AC voltage, and a rectifier in electrical communication with said secondary coil for changing said AC voltage to a DC voltage between a DC positive node and a DC negative node;
   an AC supply providing an AC current in a primary coil magnetically coupled with said secondary coil in said rotor to induce the induced AC voltage therein and to thereby cause said field winding of said rotor to be excited in the traction mode;
   wherein said rotor is externally excited, with said field winding being isolated from the magnetic flux from said set of AC stator windings by being axially spaced outside of said stator; and
   wherein said AC supply is inhibited from providing the AC current in said primary coil to prevent inducing the induced AC voltage in said secondary coil and to thereby cause said field winding of said rotor to be de-excited in the IC mode.

8. The system for integrated charging an electric vehicle according to claim 1 wherein said rotor of said hybrid excitation machine further includes a field winding configured to be excited with a DC voltage in the traction mode to interact with the magnetic flux from said set of AC stator windings and to produce a driving torque; and
   wherein said field winding of said rotor is configured to be de-excited in the IC mode preventing said rotor from producing the driving torque.

9. The system for integrated charging an electric vehicle according to claim 8, further including:
   a secondary coil included in said rotor and configured to be excited by a coupling magnetic field to generate an induced AC voltage, and a rectifier in electrical communication with said secondary coil for changing said induced AC voltage to a DC voltage between a DC positive node and a DC negative node;
   said rotor having a cylindrical configuration including a field winding connected between said DC positive node and said DC negative node and disposed within said stator;
   wherein said field winding of said rotor is configured to be excited with said DC voltage in the traction mode with said hybrid excitation machine operable as a traction motor, with said field winding interacting with the magnetic flux from said set of AC stator windings to produce a driving torque; and wherein said field winding of said rotor is configured to be de-excited in the IC mode for integrated charging (IC), thereby preventing said rotor from producing the driving torque.

10. The system for integrated charging an electric vehicle according to claim 9, wherein said rotor is self-excited, with said field winding being in quadrature to said secondary coil and each configured to interact with the magnetic flux from said set of AC stator windings and further including:
   an IC controller configured to operate a plurality of power electronics switches in an AC-DC converter using a field-oriented control to cause the magnetic flux from said set of AC stator windings to produce the coupling magnetic field that is aligned with said secondary coil in said rotor to induce the induced AC voltage therein and to thereby cause said field winding of said rotor to be excited in the traction mode; and
   wherein said IC controller is configured to operate said plurality of power electronics switches in said AC-DC converter using the field-oriented control to cause the magnetic flux from said set of AC stator windings to produce a magnetic field that is out of phase from said secondary coil in said rotor to prevent the induction of the induced AC voltage in said secondary coil and to thereby cause said field winding of said rotor to be de-excited in the IC mode.

11. The system for integrated charging an electric vehicle according to claim 1, further including:
   said rotor having a cylindrical configuration including a plurality of rotor bars extending axially therethrough; and
   each rotor bar of said plurality of rotor bars being electrically connected to an adjacent rotor bar of said plurality of rotor bars by a jumper conductor and configured to conduct electrical current in opposite axial directions; and
   all rotor bars of said plurality of rotor bars being electrically connected in a series configuration with electrical current in each rotor bar of said plurality of rotor bars flowing in a direction opposite to the electrical current in the adjacent rotor bar of the plurality of rotor bars.

12. The system for integrated charging an electric vehicle according to claim 1, further including:
   an AC-DC converter, configured to rectify the AC electrical current from the AC utility line voltage supply to an intermediate DC voltage on an intermediate DC conductor;
   a DC-DC converter, producing an output DC voltage different than an input DC voltage to the DC-DC converter;
   a battery bus energized with a first DC voltage and;
   a second DC bus energized with a second DC voltage different than the first DC voltage;
   wherein the system is configured to operate in a first mode with the DC-DC converter transmitting electrical power from the AC-DC converter to the battery bus; and
   wherein the system is configured to operate in a second mode with the DC-DC converter transmitting electrical power from battery bus to the second DC bus.

13. The system for integrated charging an electric vehicle according to claim 12, wherein the AC-DC converter includes a bridgeless totem pole power factor correction (PFC) circuit.

14. The system for integrated charging an electric vehicle according to claim 12, wherein the DC-DC converter includes a single-phase or multi-phase interleaved full bridge or half bridge resonant converter of LLC or LCLC type.

15. The system for integrated charging an electric vehicle according to claim 12, wherein the DC-DC converter includes a switch-controlled capacitor.

16. The system for integrated charging an electric vehicle according to claim 1, wherein said hybrid excitation machine further comprises a second set of windings configured to carry an electrical current in the IC mode; and
   wherein said electrical current in said second set of windings generates a magnetic flux offsetting the magnetic flux generated by the electrical current in said set of AC stator windings.

17. The system for integrated charging an electric vehicle according to claim 16, wherein said second set of windings is configured to carry an electrical current in an opposite direction as the electrical current in said set of AC stator windings in the IC mode.

18. A system for integrated charging an electric vehicle, comprising:
   a hybrid excitation machine operable in a traction mode as a traction motor or in an integrated charging (IC) mode and including a rotor separated by an air gap from a stator having a set of AC stator windings to conduct an AC electrical current to induce a magnetic flux across said air gap;
   said set of AC stator windings configured to conduct the AC electrical current from an AC utility line voltage supply in the IC mode and for filtering and/or boosting an AC voltage therefrom;
   an AC-DC converter, configured to rectify the AC electrical current from the AC utility line voltage supply to an intermediate DC voltage on an intermediate DC conductor;
   a DC-DC converter, producing an output DC voltage different than an input DC voltage to the DC-DC converter;
   a battery bus energized with a first DC voltage and;
   a second DC bus energized with a second DC voltage different than the first DC voltage;
   wherein the system is configured to operate in a first mode with the DC-DC converter transmitting electrical power from the AC-DC converter to the battery bus; and
   wherein the system is configured to operate in a second mode with the DC-DC converter transmitting electrical power from battery bus to the second DC bus.

19. The system for integrated charging an electric vehicle according to claim 18, wherein said stator of said hybrid excitation machine further includes a DC winding configured to carry a DC current to reduce the magnetic flux across said air gap and into said rotor.

20. The system for integrated charging an electric vehicle according to claim 18, wherein said hybrid excitation machine further comprises a second set of windings configured to carry an electrical current in the IC mode; and
   wherein said electrical current in said second set of windings generates a magnetic flux offsetting the magnetic flux generated by the electrical current in said set of AC stator windings.

* * * * *